(12) United States Patent
Norman et al.

(10) Patent No.: US 9,913,540 B2
(45) Date of Patent: Mar. 13, 2018

(54) CHAIR CONSTRUCTION

(71) Applicant: Steelcase Inc., Grand Rapids, MI (US)

(72) Inventors: Christopher J. Norman, Middleville, MI (US); Nickolaus William Charles Deevers, Grand Rapids, MI (US); Todd Quigley, Caledonia, MI (US); Mark J. Dinneweth, Spring Lake, MI (US)

(73) Assignee: Steelcase Inc., Grand Rapids, MI (US)

( * ) Notice: Subject to any disclaimer, the term of this patent is extended or adjusted under 35 U.S.C. 154(b) by 817 days.

(21) Appl. No.: 14/029,995

(22) Filed: Sep. 18, 2013

(65) Prior Publication Data

US 2014/0084660 A1    Mar. 27, 2014

Related U.S. Application Data

(63) Continuation of application No. 29/457,269, filed on Jun. 7, 2013, now Pat. No. Des. 706,547, and a continuation of application No. 29/457,254, filed on Jun. 7, 2013, now Pat. No. Des. 703,987, and a continuation of application No. 29/457,251, filed on Jun. 7, 2013, now Pat. No. Des. 721,529.

(60) Provisional application No. 61/704,018, filed on Sep. 21, 2012.

(51) Int. Cl.
| | |
|---|---|
| A47C 7/46 | (2006.01) |
| A47C 7/24 | (2006.01) |
| A47C 7/28 | (2006.01) |
| B60N 2/60 | (2006.01) |
| B60N 2/58 | (2006.01) |
| A47C 31/02 | (2006.01) |

(52) U.S. Cl.
CPC .............. *A47C 7/46* (2013.01); *A47C 7/24* (2013.01); *A47C 7/28* (2013.01); *A47C 7/462* (2013.01); *A47C 31/023* (2013.01); *B60N 2/5825* (2013.01); *B60N 2/6027* (2013.01)

(58) Field of Classification Search
CPC ... A47C 31/023; B60N 2/5825; B60N 2/6027
USPC ..... 297/218.1, 218.3, 218.5, 228.13, 228.11, 297/452.13
See application file for complete search history.

(56) References Cited

U.S. PATENT DOCUMENTS

| | | |
|---|---|---|
| 278,097 A | 5/1883 | Collins |
| 415,283 A | 11/1889 | Riley |
| 798,271 A | 8/1905 | Donalds |

(Continued)

FOREIGN PATENT DOCUMENTS

| | | |
|---|---|---|
| EP | 901934 | 3/1999 |
| FR | 2926194 | 7/2009 |

(Continued)

*Primary Examiner* — Syed A Islam
(74) *Attorney, Agent, or Firm* — Price Heneveld LLP

(57) ABSTRACT

A chair component assembly includes a support component adapted to support a portion of a seated user and including a shell member having an outer peripheral edge, the support component further including at least one coupler having an interior and an opening facing the outer peripheral edge of the shell member, and at least one tab member located substantially proximate the opening of the at least one coupler, and an upholstery cover assembly wrapped about at least a portion of the support component and including an edge that is retained within the interior of the at least one cupler by the at least one tab member.

26 Claims, 33 Drawing Sheets

(56) References Cited

U.S. PATENT DOCUMENTS

| | | |
|---|---|---|
| 1,065,190 A | 6/1913 | Tobin |
| 1,260,531 A | 3/1918 | Fiala, Jr. |
| 1,473,098 A | 11/1923 | Hollenbeck et al. |
| 1,474,226 A | 11/1923 | Bass |
| 1,603,896 A | 10/1926 | Bingaman |
| 1,681,179 A | 8/1928 | Fry |
| 1,704,703 A | 3/1929 | Fry |
| 1,782,815 A | 11/1930 | Fry |
| 1,862,476 A | 6/1932 | Fry |
| 1,951,631 A | 3/1934 | Sallop |
| 2,120,036 A | 6/1938 | Northup |
| 2,151,628 A | 3/1939 | Van Derveer |
| 2,170,224 A | 8/1939 | Tarr |
| 2,191,848 A | 2/1940 | Cramer et al. |
| 2,192,070 A | 2/1940 | Cramer et al. |
| 2,308,358 A | 1/1943 | Cramer |
| 2,352,938 A | 7/1944 | Caughey |
| 2,361,370 A | 10/1944 | Grunwald |
| 2,379,086 A | 6/1945 | Kalpakoff |
| 2,527,544 A | 10/1950 | Goodwin |
| 2,567,550 A | 9/1951 | Clark et al. |
| 2,586,698 A | 2/1952 | Neely |
| 2,623,477 A | 12/1952 | Tuttle |
| 2,631,370 A * | 3/1953 | Gray ............... B23D 29/00 |
| | | 30/228 |
| 2,646,840 A | 7/1953 | Good |
| 2,659,413 A | 11/1953 | Cramer |
| 2,738,835 A | 3/1956 | Eames |
| 2,744,567 A | 5/1956 | Larkin |
| 2,796,116 A | 6/1957 | Wilfert |
| 2,807,314 A | 9/1957 | Larkin |
| 2,861,318 A | 11/1958 | Pernberg |
| 2,894,565 A | 7/1959 | Conner |
| 3,003,816 A | 10/1961 | Wilson |
| 3,012,819 A | 12/1961 | Mungovan |
| 3,103,671 A | 9/1963 | Heckethorn |
| 3,157,434 A | 11/1964 | Gianvecchio |
| 3,165,307 A | 1/1965 | Edwards |
| 3,174,797 A | 3/1965 | Neufeld |
| 3,175,269 A | 3/1965 | Raduns et al. |
| 3,176,873 A | 4/1965 | Montgomery |
| 3,253,859 A | 5/1966 | Merriman et al. |
| 3,266,545 A | 8/1966 | Kruissink |
| 3,278,229 A | 10/1966 | Bates |
| 3,292,974 A | 12/1966 | Gelbman |
| 3,338,630 A | 8/1967 | Dudley |
| 3,376,068 A | 4/1968 | Walkinshaw |
| 3,411,824 A | 11/1968 | White et al. |
| 3,423,775 A | 1/1969 | Cockerill |
| 3,483,611 A | 12/1969 | Balamuth et al. |
| 3,497,259 A | 2/1970 | Sherfey |
| 3,586,370 A | 6/1971 | Barecki et al. |
| 3,628,830 A | 12/1971 | Mitjans |
| 3,722,950 A | 3/1973 | Harnick |
| 3,747,178 A | 7/1973 | Harder, Jr. |
| 3,794,378 A | 2/1974 | Haslam et al. |
| 3,844,614 A | 10/1974 | Babbs |
| 3,860,287 A | 1/1975 | Platt |
| 3,861,741 A | 1/1975 | Kaufman |
| 3,880,467 A | 4/1975 | Tischler |
| 3,883,173 A | 5/1975 | Shephard et al. |
| 3,995,893 A | 12/1976 | De La Taille et al. |
| 4,057,292 A | 11/1977 | Arnold |
| 4,065,182 A | 12/1977 | Braniff et al. |
| 4,092,049 A | 5/1978 | Schoblom |
| 4,134,616 A | 1/1979 | Christensen |
| D257,473 S | 11/1980 | Wilson |
| 4,284,305 A | 8/1981 | Porter et al. |
| D261,078 S | 10/1981 | Wilson |
| 4,352,524 A * | 10/1982 | Crosby ............... A47C 31/023 |
| | | 24/442 |
| 4,355,444 A | 10/1982 | Haney |
| 4,364,607 A | 12/1982 | Tamburini |
| 4,370,002 A | 1/1983 | Koepke |
| D274,865 S | 7/1984 | Murry |
| D274,958 S | 8/1984 | Aronowitz et al. |
| D275,054 S | 8/1984 | Aronowitz et al. |
| 4,498,702 A | 2/1985 | Raftery |
| 4,498,704 A | 2/1985 | Hildreth |
| 4,526,420 A | 7/1985 | Kawamura et al. |
| 4,558,904 A | 12/1985 | Schultz |
| 4,567,615 A | 2/1986 | Fanti |
| 4,585,272 A | 4/1986 | Ballarini |
| D283,762 S | 5/1986 | Caruso |
| D287,197 S | 12/1986 | Zakharov |
| 4,659,614 A | 4/1987 | Vitale |
| 4,660,887 A | 4/1987 | Fleming et al. |
| 4,685,738 A | 8/1987 | Tinus |
| 4,691,963 A | 9/1987 | Mikuniya et al. |
| 4,715,651 A | 12/1987 | Wakamatsu |
| 4,720,142 A | 1/1988 | Holdredge et al. |
| D296,623 S | 7/1988 | Chadwick et al. |
| 4,757,854 A | 7/1988 | Rippberger |
| 4,776,633 A | 10/1988 | Knoblock et al. |
| 4,786,103 A | 11/1988 | Selbert |
| 4,798,416 A | 1/1989 | Faust et al. |
| D301,190 S | 5/1989 | Levine |
| 4,826,249 A | 5/1989 | Bradbury |
| 4,838,610 A | 6/1989 | Perrin |
| 4,860,398 A | 8/1989 | Karpinski |
| 5,039,158 A | 8/1991 | Maier |
| 5,050,931 A | 9/1991 | Knoblock |
| 5,067,773 A | 11/1991 | Koa |
| 5,100,201 A | 3/1992 | Becker, III et al. |
| 5,105,492 A | 4/1992 | Karpinski |
| 5,112,106 A | 5/1992 | Asbjornsen et al. |
| 5,117,537 A | 6/1992 | Hunter et al. |
| 5,133,587 A | 7/1992 | Hadden, Jr. |
| 5,195,222 A * | 3/1993 | Rink ............... A47C 31/023 |
| | | 24/581.1 |
| RE34,333 E | 8/1993 | Boerema et al. |
| 5,235,259 A | 8/1993 | Dhindsa et al. |
| 5,246,269 A | 9/1993 | DeBoer et al. |
| 5,251,962 A | 10/1993 | Saito |
| 5,277,476 A | 1/1994 | Caldwell |
| 5,295,732 A | 3/1994 | Boisset |
| 5,308,028 A | 5/1994 | Kornberg |
| 5,316,375 A | 5/1994 | Breen |
| 5,318,348 A | 6/1994 | Hess |
| 5,320,407 A | 6/1994 | Tell |
| 5,326,151 A | 7/1994 | Smith et al. |
| 5,328,244 A | 7/1994 | Ishihara et al. |
| 5,328,248 A | 7/1994 | Nishiyama |
| 5,333,921 A | 8/1994 | Dinsmoor, III |
| 5,338,091 A | 8/1994 | Miller |
| 5,338,092 A * | 8/1994 | Wiltsey ............... A47C 31/11 |
| | | 297/218.4 |
| 5,339,748 A | 8/1994 | Bilotti |
| 5,352,022 A | 10/1994 | Knoblock |
| 5,401,075 A | 3/1995 | Venuto et al. |
| 5,457,968 A | 10/1995 | McClintock et al. |
| 5,462,335 A | 10/1995 | Seyler |
| 5,478,134 A | 12/1995 | Bernard et al. |
| 5,503,454 A | 4/1996 | Sakamoto |
| 5,518,292 A | 5/1996 | Cozzani |
| 5,529,373 A | 6/1996 | Olson et al. |
| 5,547,249 A | 8/1996 | Riley et al. |
| 5,560,677 A | 10/1996 | Cykana et al. |
| 5,605,373 A | 2/1997 | Wildern, IV et al. |
| 5,630,643 A | 5/1997 | Scholten et al. |
| 5,641,552 A | 6/1997 | Tillner |
| 5,642,556 A | 7/1997 | Alexander |
| 5,651,583 A | 7/1997 | Klingler et al. |
| 5,653,503 A | 8/1997 | Taggart |
| 5,690,387 A | 11/1997 | Sarti |
| 5,716,096 A | 2/1998 | Pryde et al. |
| 5,716,099 A | 2/1998 | McDiarmid |
| 5,716,101 A | 2/1998 | Frinier et al. |
| D392,128 S | 3/1998 | Infanti |
| 5,722,723 A | 3/1998 | Riley et al. |
| 5,724,917 A | 3/1998 | Dodson et al. |
| 5,733,002 A | 3/1998 | Riley et al. |
| 5,768,758 A | 6/1998 | Deignan et al. |
| 5,781,258 A | 7/1998 | Dabral et al. |

(56) References Cited

U.S. PATENT DOCUMENTS

| | | | |
|---|---|---|---|
| 5,802,681 A | 9/1998 | Riley et al. |
| 5,806,927 A | 9/1998 | Schneider |
| 5,806,930 A | 9/1998 | Knoblock |
| 5,820,213 A | 10/1998 | Severinski |
| 5,820,222 A | 10/1998 | De Filippo |
| 5,826,312 A | 10/1998 | Schroder et al. |
| 5,826,939 A | 10/1998 | Beyer |
| D401,088 S | 11/1998 | Chen |
| 5,845,967 A | 12/1998 | Kane et al. |
| 5,871,258 A | 2/1999 | Battey et al. |
| 5,879,051 A | 3/1999 | Cozzani |
| D409,849 S | 5/1999 | Tseng |
| 5,904,397 A | 5/1999 | Fismen |
| 5,935,364 A | 8/1999 | Groendal et al. |
| 5,948,208 A | 9/1999 | Speich |
| 5,954,395 A | 9/1999 | Moulins et al. |
| 5,954,399 A | 9/1999 | Hong |
| 5,967,613 A | 10/1999 | McKeever |
| 5,971,478 A | 10/1999 | Hurite |
| 5,979,979 A | 11/1999 | Guerinot et al. |
| 5,988,754 A | 11/1999 | Lamart et al. |
| 5,989,370 A | 11/1999 | Wannebo |
| 5,996,204 A | 12/1999 | Norwood |
| 6,022,072 A | 2/2000 | Moyer |
| 6,050,636 A | 4/2000 | Chevallier et al. |
| 6,056,360 A | 5/2000 | Schneider |
| 6,059,368 A | 5/2000 | Stumpf et al. |
| 6,062,649 A | 5/2000 | Nagel et al. |
| 6,098,684 A | 8/2000 | Terawaki |
| 6,099,075 A | 8/2000 | Watkins |
| 6,099,076 A | 8/2000 | Nagel et al. |
| 6,102,482 A | 8/2000 | Dettoni et al. |
| 6,131,312 A * | 10/2000 | Hung | A43C 13/14 36/11.5 |
| 6,149,239 A | 11/2000 | Markussen et al. |
| 6,189,972 B1 | 2/2001 | Chu et al. |
| 6,199,252 B1 | 3/2001 | Masters et al. |
| 6,228,195 B1 | 5/2001 | Spatz et al. |
| 6,257,665 B1 | 7/2001 | Nagamitsu et al. |
| 6,260,921 B1 | 7/2001 | Chu et al. |
| 6,313,993 B1 | 11/2001 | Hinshaw et al. |
| 6,315,364 B1 | 11/2001 | Fujita et al. |
| 6,354,662 B1 | 3/2002 | Su |
| 6,375,770 B1 | 4/2002 | Meltzer et al. |
| 6,378,946 B1 | 4/2002 | Cope et al. |
| 6,378,949 B1 | 4/2002 | Maeda et al. |
| 6,402,246 B1 | 6/2002 | Mundell |
| D460,300 S | 7/2002 | Fifield et al. |
| 6,422,650 B1 | 7/2002 | Chien-Shen |
| 6,428,083 B2 | 8/2002 | Dettoni et al. |
| 6,460,927 B1 | 10/2002 | Groth |
| 6,471,294 B1 | 10/2002 | Dammermann et al. |
| 6,485,103 B1 | 11/2002 | Yamada et al. |
| 6,488,379 B2 | 12/2002 | Kane |
| 6,499,802 B2 | 12/2002 | Drira |
| 6,508,509 B2 | 1/2003 | Peterson |
| 6,517,651 B2 | 2/2003 | Azulay |
| 6,521,067 B1 | 2/2003 | Clark |
| 6,543,843 B2 | 4/2003 | Moilanen |
| 6,547,904 B1 | 4/2003 | Young |
| D474,346 S | 5/2003 | Saylor et al. |
| 6,557,217 B2 | 5/2003 | Szabo |
| 6,558,491 B2 | 5/2003 | Jahn et al. |
| 6,575,530 B1 | 6/2003 | Fischer et al. |
| 6,588,842 B2 | 7/2003 | Stumpf et al. |
| 6,595,591 B2 | 7/2003 | Fourrey et al. |
| 6,612,648 B1 | 9/2003 | Hasiguchi |
| 6,637,822 B1 | 10/2003 | Kato |
| 6,659,550 B2 | 12/2003 | Hackett |
| 6,688,690 B2 | 2/2004 | Watson et al. |
| 6,695,403 B1 | 2/2004 | Su |
| 6,695,407 B1 | 2/2004 | Lin |
| 6,701,551 B1 | 3/2004 | Antinori |
| 6,722,742 B2 | 4/2004 | Potes et al. |
| 6,745,444 B2 | 6/2004 | Moilanen |
| 6,761,338 B2 | 7/2004 | Yamasaki |
| 6,767,066 B1 | 7/2004 | Tornero |
| 6,779,846 B2 | 8/2004 | Spendlove et al. |
| 6,797,088 B2 | 9/2004 | Solinski |
| 6,811,218 B2 | 11/2004 | Deimen et al. |
| 6,817,675 B2 | 11/2004 | Buss et al. |
| 6,838,155 B2 | 1/2005 | Cappucci et al. |
| D502,330 S | 3/2005 | Petruccelli |
| 6,869,495 B2 | 3/2005 | Snooks |
| 6,874,852 B2 | 4/2005 | Footitt |
| 6,880,886 B2 | 4/2005 | Bodnar et al. |
| 6,886,890 B2 | 5/2005 | Rowland et al. |
| 6,890,030 B2 | 5/2005 | Wilkerson et al. |
| 6,908,159 B2 | 6/2005 | Prince et al. |
| 6,910,741 B2 | 6/2005 | Footitt |
| D508,805 S | 8/2005 | Cvek |
| 6,926,856 B2 | 8/2005 | Hus et al. |
| 6,935,695 B2 | 8/2005 | Carta Gonzalez et al. |
| 6,942,300 B2 | 9/2005 | Numa et al. |
| 6,955,402 B2 | 10/2005 | Vanderiet et al. |
| 6,957,861 B1 | 10/2005 | Chou et al. |
| 6,976,737 B1 | 12/2005 | Dandolo |
| 6,983,997 B2 | 1/2006 | Wilkerson et al. |
| 6,991,291 B2 | 1/2006 | Knoblock et al. |
| 7,021,712 B2 | 4/2006 | Spendlove et al. |
| 7,055,902 B2 | 6/2006 | Matsushita |
| 7,055,911 B2 | 6/2006 | Simpson et al. |
| 7,073,693 B2 | 7/2006 | Law |
| 7,093,897 B2 | 8/2006 | Terrand et al. |
| 7,097,247 B2 | 8/2006 | Battey et al. |
| 7,104,604 B1 | 9/2006 | Kang |
| 7,114,777 B2 | 10/2006 | Knoblock et al. |
| 7,131,700 B2 | 11/2006 | Knoblock et al. |
| D534,748 S | 1/2007 | Chu |
| 7,172,255 B2 | 2/2007 | Wanke |
| 7,195,277 B2 | 3/2007 | Tracht et al. |
| D540,080 S | 4/2007 | Su |
| 7,204,557 B1 | 4/2007 | Burton |
| 7,207,630 B2 | 4/2007 | Reynolds |
| 7,226,130 B2 | 6/2007 | Tubergen et al. |
| 7,229,054 B2 | 6/2007 | Hu |
| 7,237,841 B2 | 7/2007 | Norman et al. |
| D550,976 S | 9/2007 | Bellini et al. |
| D552,898 S | 10/2007 | Wei |
| 7,293,378 B2 | 11/2007 | Bihr |
| 7,328,950 B2 | 2/2008 | McMillen et al. |
| 7,334,845 B2 | 2/2008 | Peterson et al. |
| 7,344,194 B2 | 3/2008 | Maier et al. |
| 7,347,495 B2 | 3/2008 | Beyer et al. |
| 7,360,835 B2 | 4/2008 | Tubergen et al. |
| 7,365,807 B2 | 4/2008 | Iwai |
| 7,367,629 B2 | 5/2008 | Kepler et al. |
| 7,395,590 B2 | 7/2008 | Johnson et al. |
| 7,419,215 B2 | 9/2008 | Wilkerson et al. |
| D579,223 S | 10/2008 | Greutmann |
| 7,441,839 B2 | 10/2008 | Pennington et al. |
| D579,676 S | 11/2008 | Rheault et al. |
| 7,461,442 B2 | 12/2008 | Johnson et al. |
| 7,472,962 B2 | 1/2009 | Caruso et al. |
| 7,484,802 B2 | 2/2009 | Beyer et al. |
| 7,494,188 B1 | 2/2009 | Lin |
| 7,510,245 B2 | 3/2009 | Okazaki et al. |
| 7,527,335 B2 | 5/2009 | Eberlein et al. |
| 7,537,280 B2 | 5/2009 | Bleloch |
| 7,559,100 B2 * | 7/2009 | Pedde | B60N 2/5825 24/584.1 |
| 7,594,700 B2 | 9/2009 | Stumpf et al. |
| 7,604,298 B2 | 10/2009 | Peterson et al. |
| D603,193 S | 11/2009 | Sandoval |
| D604,527 S | 11/2009 | Ooki et al. |
| 7,647,714 B2 | 1/2010 | Coffield et al. |
| 7,669,925 B2 | 3/2010 | Beck et al. |
| 7,712,834 B2 | 5/2010 | Knoblock et al. |
| 7,748,783 B2 | 7/2010 | Kinoshita et al. |
| 7,775,601 B2 | 8/2010 | Wu |
| 7,794,555 B2 | 9/2010 | LaFond et al. |
| 7,798,573 B2 | 9/2010 | Pennington et al. |
| 7,806,476 B2 | 10/2010 | Forgatsch et al. |
| 7,815,992 B2 | 10/2010 | Pedde et al. |

(56) References Cited

U.S. PATENT DOCUMENTS

| | | |
|---|---|---|
| 7,837,260 B2 | 11/2010 | Hein et al. |
| 7,837,265 B2 | 11/2010 | Machael et al. |
| 7,837,272 B2 | 11/2010 | Masunaga et al. |
| 7,841,666 B2 | 11/2010 | Schmitz et al. |
| 7,850,247 B2 | 12/2010 | Stauske et al. |
| 7,857,388 B2 | 12/2010 | Bedford et al. |
| 7,891,735 B2 | 2/2011 | Oku |
| 7,892,374 B2 | 2/2011 | Pekar |
| 7,901,002 B2 | 3/2011 | Mashimo |
| 7,927,441 B2 | 4/2011 | Lau |
| D638,633 S | 5/2011 | Du |
| D639,082 S | 6/2011 | Pengelly |
| 8,029,066 B2 | 10/2011 | Su |
| 8,038,221 B2 | 10/2011 | Smith et al. |
| D653,868 S | 2/2012 | Samuel et al. |
| 8,112,849 B2 | 2/2012 | Lapouge |
| 8,128,166 B2 | 3/2012 | Hoshina et al. |
| 8,141,955 B1 | 3/2012 | Maassarani |
| 8,147,000 B1 | 4/2012 | Drake |
| 8,157,324 B2 | 4/2012 | Matsuzaki et al. |
| 8,162,399 B2 | 4/2012 | Demontis et al. |
| 8,197,010 B2 | 6/2012 | Galbreath et al. |
| 8,388,062 B2 | 3/2013 | Hennig et al. |
| 8,733,834 B2 * | 5/2014 | Palmer ............... B60N 2/5841 297/218.1 |
| 2002/0101109 A1 | 8/2002 | Stiller et al. |
| 2003/0093117 A1 * | 5/2003 | Saadat ............... A61B 17/0401 606/221 |
| 2003/0137172 A1 | 7/2003 | Chu |
| 2003/0141781 A1 | 7/2003 | Suzuki et al. |
| 2005/0114989 A1 | 6/2005 | Harward |
| 2005/0121954 A1 | 6/2005 | Coffield et al. |
| 2005/0225156 A1 | 10/2005 | Stiller et al. |
| 2005/0230026 A1 | 10/2005 | Kramer |
| 2005/0264087 A1 | 12/2005 | Diffrient |
| 2006/0261653 A1 | 11/2006 | McMillen et al. |
| 2007/0000112 A1 | 1/2007 | Johnson et al. |
| 2007/0120402 A1 | 5/2007 | Bronzini |
| 2007/0170756 A1 | 7/2007 | Kang |
| 2007/0200417 A1 | 8/2007 | York et al. |
| 2008/0005870 A1 | 1/2008 | Chase |
| 2009/0030456 A1 | 1/2009 | Kuo |
| 2009/0169756 A1 * | 7/2009 | Joosten ............... B44D 3/10 427/421.1 |
| 2010/0117434 A1 * | 5/2010 | Galbreath ............ B60N 2/5825 297/452.58 |
| 2010/0148546 A1 | 6/2010 | Demontis et al. |
| 2010/0258702 A1 | 10/2010 | Werner et al. |
| 2011/0043013 A1 | 2/2011 | Sugiura et al. |
| 2011/0062758 A1 | 3/2011 | Wiese |
| 2011/0101764 A1 | 5/2011 | van Hekken et al. |
| 2011/0169321 A1 * | 7/2011 | Jung ............... A47C 7/282 297/452.64 |
| 2011/0260519 A1 | 10/2011 | Carrigan, Sr. |
| 2013/0033084 A1 * | 2/2013 | Sei ............... B60N 2/5825 297/452.58 |
| 2013/0043710 A1 | 2/2013 | Pleskot |
| 2013/0069414 A1 | 3/2013 | Ko |
| 2014/0077540 A1 * | 3/2014 | Peterson ............... A47C 31/023 297/220 |
| 2014/0077542 A1 * | 3/2014 | Vander Veen ......... A47C 1/032 297/228.11 |
| 2015/0015053 A1 * | 1/2015 | Hong ............... B60N 2/5825 297/452.58 |
| 2015/0168009 A1 * | 6/2015 | Otway ............... F24F 13/20 150/165 |

FOREIGN PATENT DOCUMENTS

| | | |
|---|---|---|
| GB | 2447282 | 9/2008 |
| WO | WO2009092955 | 7/2009 |

* cited by examiner

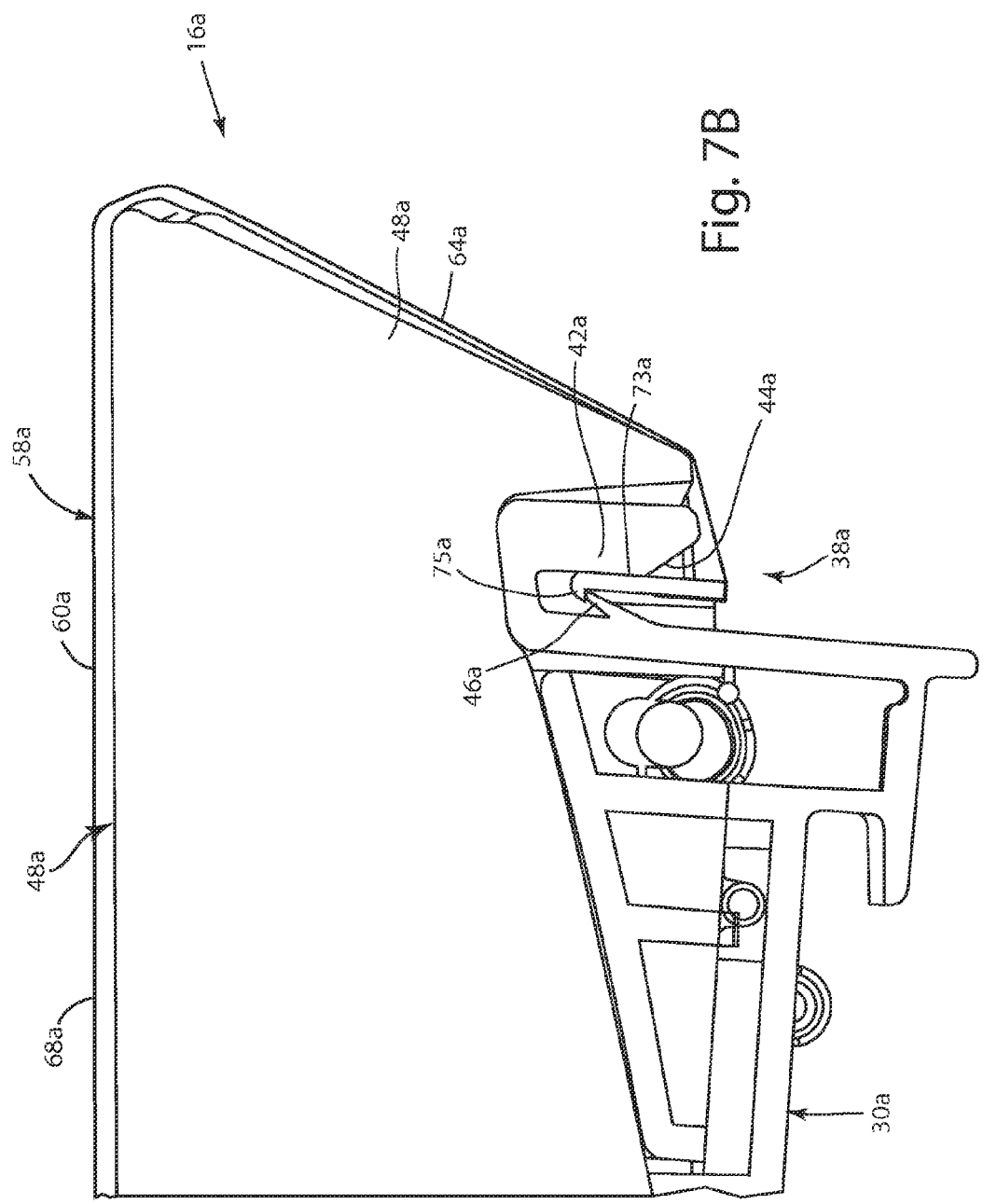

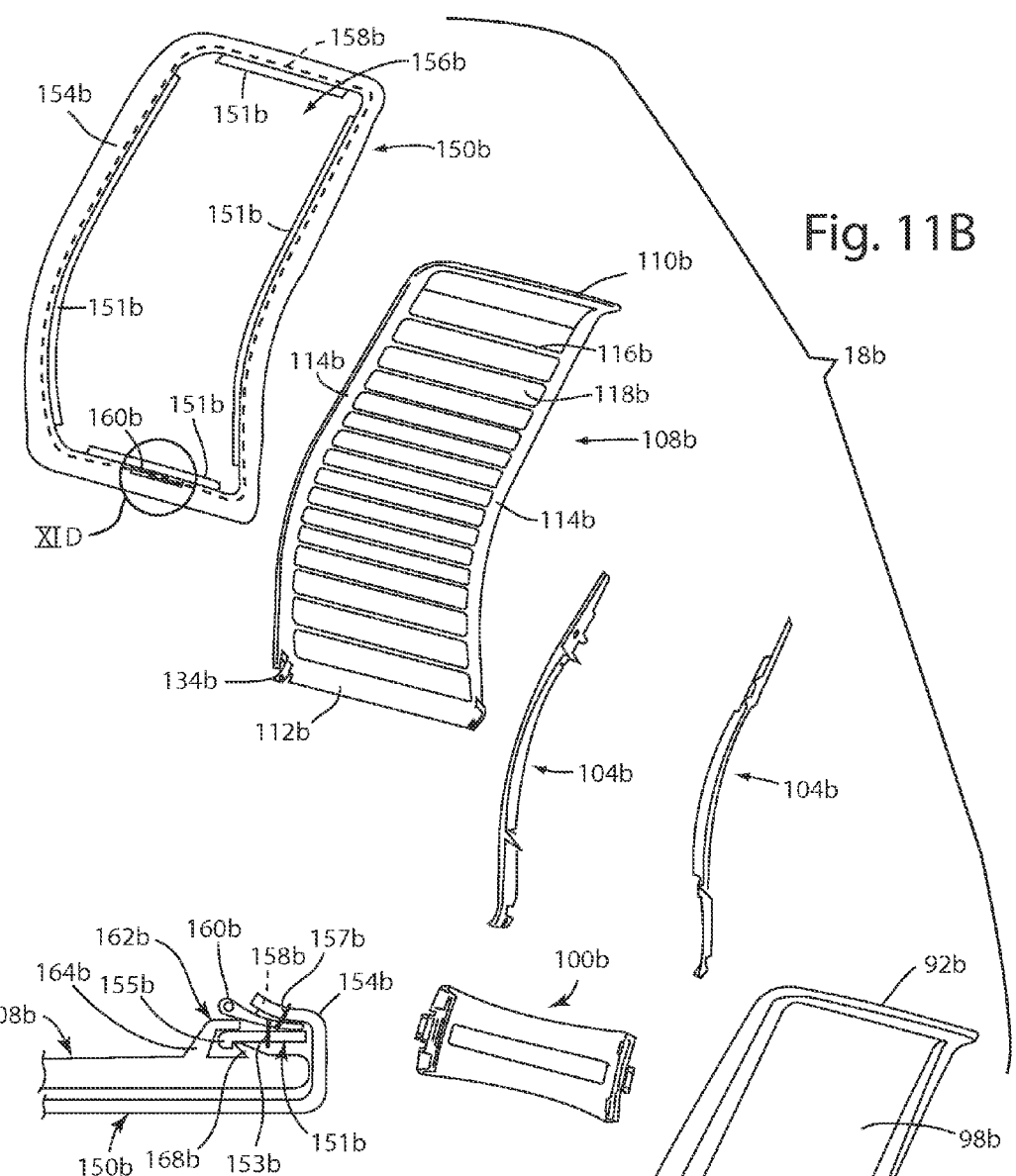
Fig. 11B
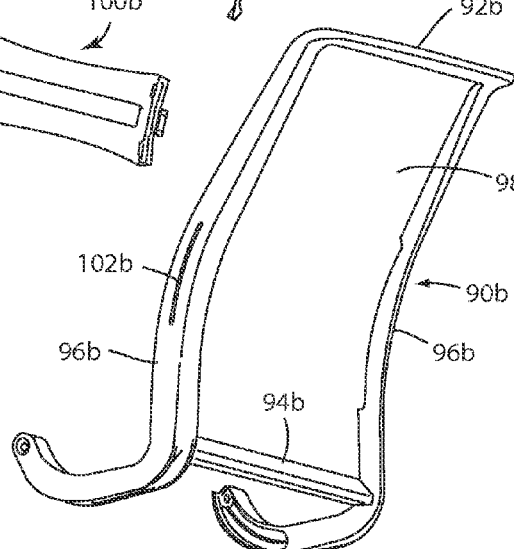
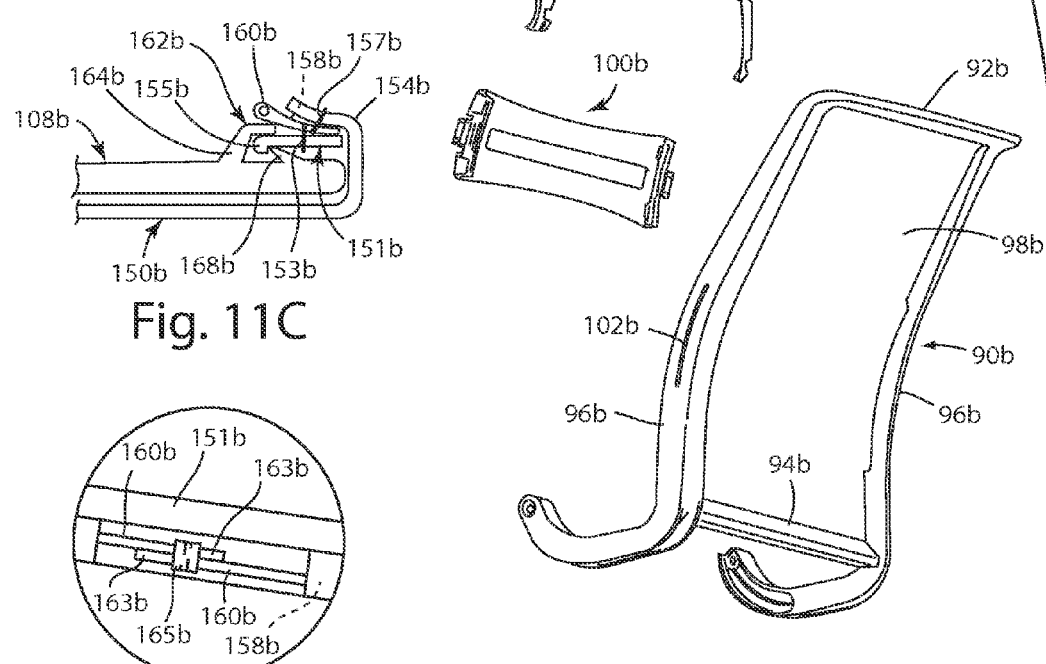
Fig. 11C
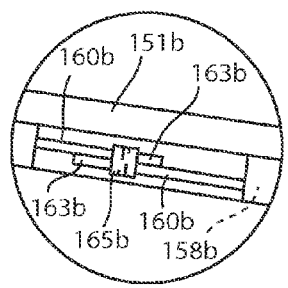
Fig. 11D

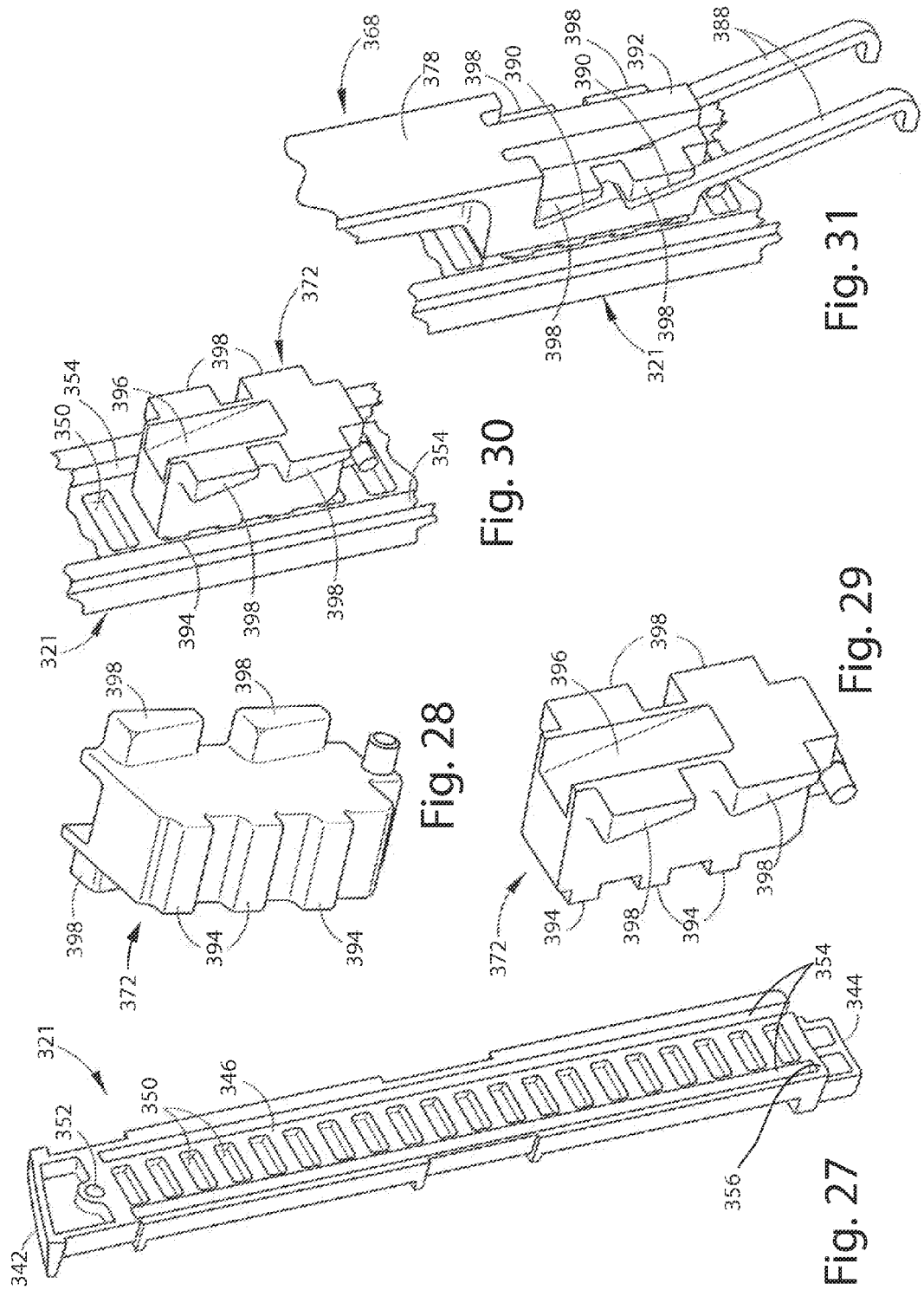

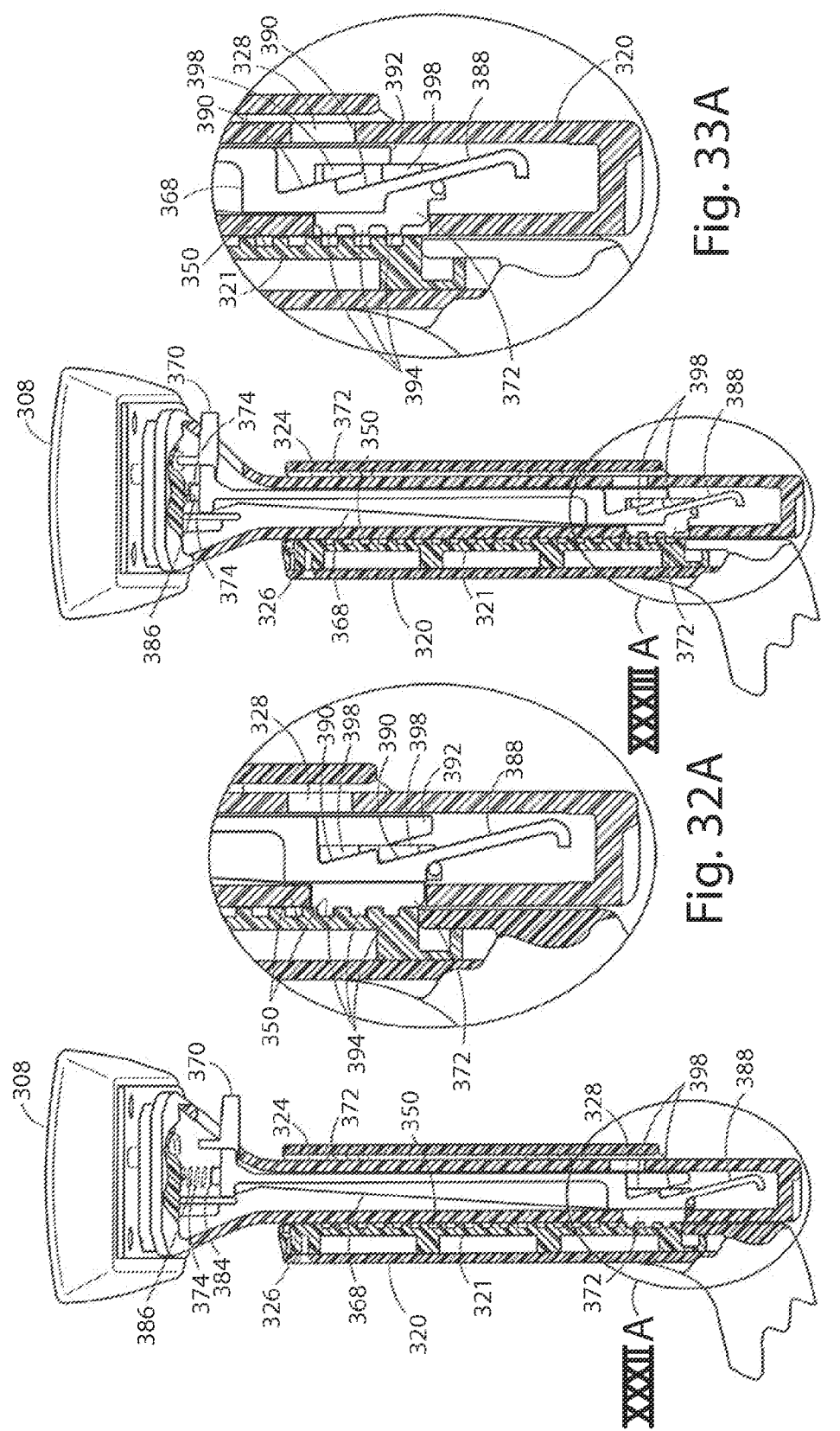

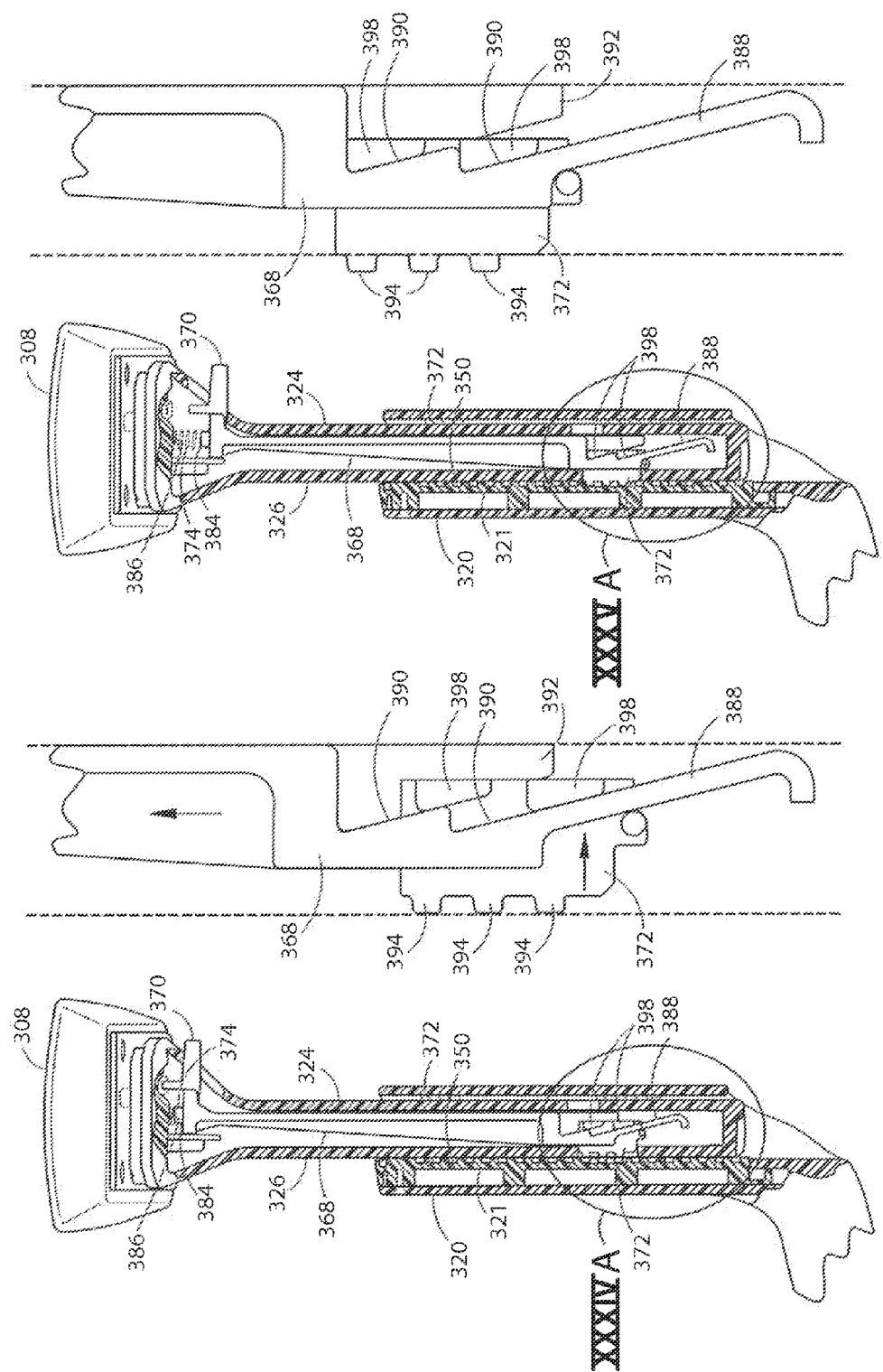

CHAIR CONSTRUCTION

CROSS REFERENCE TO RELATED APPLICATIONS

This application claims the benefit of U.S. Provisional Patent Application No. 61/704,018, filed on Sep. 21, 2012, entitled "CHAIR CONSTRUCTION," U.S. Design Patent Application No. 29/457,269, filed on Jun. 7, 2013, entitled "CHAIR," U.S. Design Patent Application No. 29/457,254, filed on Jun. 7, 2013, entitled "CHAIR," and U.S. Design Patent Application No. 29/457,251, filed on Jun. 7, 2013, entitled "HANDLE APPARATUS," the entire disclosures of which are incorporated herein by reference.

BACKGROUND OF THE INVENTION

The present invention relates to a chair construction, and in particular to an office chair construction comprising a back assembly allowing differing amounts of flexibility along four separate zones, as well as a back assembly and a seat assembly each covered by upholstery coverings.

BRIEF SUMMARY OF THE INVENTION

One aspect of the present invention is to provide a chair component assembly that comprises a support component adapted to support a portion of a seated user including a shell member having an outer peripheral edge, the support component further including at least one coupler having an interior and an opening facing the outer peripheral edge of the shell member, and at least one tab member located substantially proximate the opening of the at least one coupler, and an upholstery cover assembly wrapped about at least a portion of the support component and including an edge that is retained within the interior of the at least one coupler by the at least one tab member.

Another aspect of the present invention is to provide a chair assembly that comprises a support component adapted to support a portion of a seated user and including a shell member having a channel and at least one fastener located within the channel, and an upholstery cover assembly wrapped about at least a portion of the support component and including a drawstring located within the drawstring tunnel, wherein the drawstring is adapted to draw the upholstery cover assembly about the support component, and wherein at least one of the drawstring and the drawstring tunnel are retained within the channel by the at least one coupler.

Yet another aspect of the present invention is to provide a chair component assembly that comprises a support component adapted to support a portion of a seated user and including a shell member having an aperture, an upholstery cover assembly wrapped about at least a portion of the support component and including a drawstring located within a drawstring tunnel, wherein the drawstring is adapted to draw the upholstery cover assembly about the support component, and wherein the drawstring includes at least one free end, and at least one fastener engaging the aperture of the shell member and securing at least a portion of the at least one free end of the drawstring within the aperture.

These and other features and advantages of the present invention will be further understood and appreciated by those skilled in the art by reference to the following specification, claims, and appended drawings.

BRIEF DESCRIPTION OF THE DRAWINGS

FIG. 7B is a cross-sectional front elevational view of an alternative embodiment of the seat assembly;

FIG. 11B is an exploded back perspective view of an alternative embodiment of the back assembly;

FIG. 11C is a cross-sectional view of the alternative embodiment of the back assembly;

FIG. 11D is an enlarged view of the area XI D, FIG. 11B;

FIG. 27 is a perspective view of a post showing a first vertical surface of the post including detents;

FIG. 28 is a front perspective view of a locking member;

FIG. 29 is a rear perspective view of the locking member of FIG. 28;

FIG. 30 is a fragmentary view of the post and locking member;

FIG. 31 is a fragmentary view of the post, locking member and actuator rod;

FIG. 32 is a cross-sectional view of the armrest in a locked position;

FIG. 32A is an enlarged fragmentary view of the circled area XXIXA in FIG. 32;

FIG. 33 is a cross-sectional view of the armrest in FIG. 32 shown in an unlocked position;

FIG. 33A is an enlarged fragmentary view of the circled area XXXA in FIG. 33;

FIG. 34 is a cross-sectional view of the armrest in FIG. 32 shown in an unlocked position;

FIG. 34A is an enlarged schematic view of the circled area XXXIA in FIG. 34;

FIG. 35 is a cross-sectional view of the armrest in FIG. 32 shown in a locked position;

FIG. 35A is an enlarged schematic view of the circled area XXXIIA in FIG. 35;

DETAILED DESCRIPTION OF THE PREFERRED EMBODIMENTS

Figure 1:
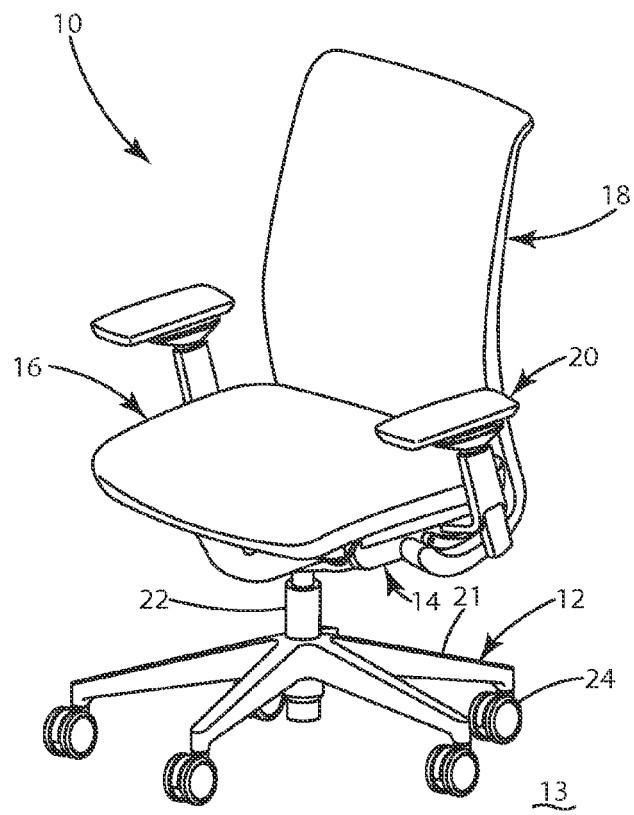
FIG. 1 is a front perspective view of a chair assembly embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise. Various elements of the embodiments disclosed herein may be described as being operably coupled to one another, which includes elements either directly or indirectly coupled to one another.

Figure 2:
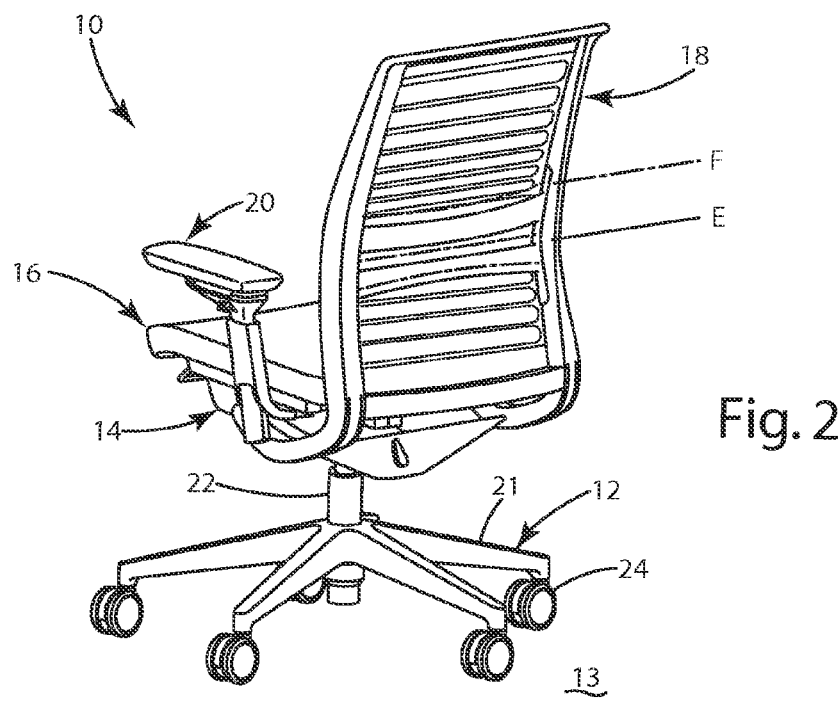
FIG. 2 is a rear perspective view of the chair assembly.

The reference numeral 10 (FIGS. 1 and 2) generally designates a chair assembly embodying the present invention. In the illustrated example, the chair assembly 10 includes a castered base assembly 12 abutting and supported by a floor surface 13, a control or support assembly 14 supported by the castered base assembly 12, a seat assembly 16 and a back assembly 18 each operably coupled with the control assembly 14, and a pair of arm assemblies 20. The seat assembly 16 (FIG. 3) and the back assembly 18 are operably coupled with the control assembly 14 such that the back assembly 18 is movable between a fully upright position A and a fully reclined position B, and further such that the seat assembly 16 is movable between a fully upright position C and a fully reclined position D corresponding to the fully upright position A and the fully reclined position B of the back assembly 18, respectively.

The base assembly 12 includes a plurality of pedestal arms 21 radially extending and spaced about a hollow central column 22 that houses a pneumatic cylinder therein for adjusting the overall vertical height of the control assembly 14, the seat assembly 16 and the back assembly 18 above the floor surface 13. Each pedestal arm 21 is supported above the floor surface 13 by an associated caster assembly 24. Although the base assembly 12 is illustrated as including a multiple-arm pedestal assembly, it is noted that other suitable supporting structures may be utilized, including but not limited to fixed columns, multiple leg arrangements, vehicle seat support assemblies, and the like.

Figure 4:
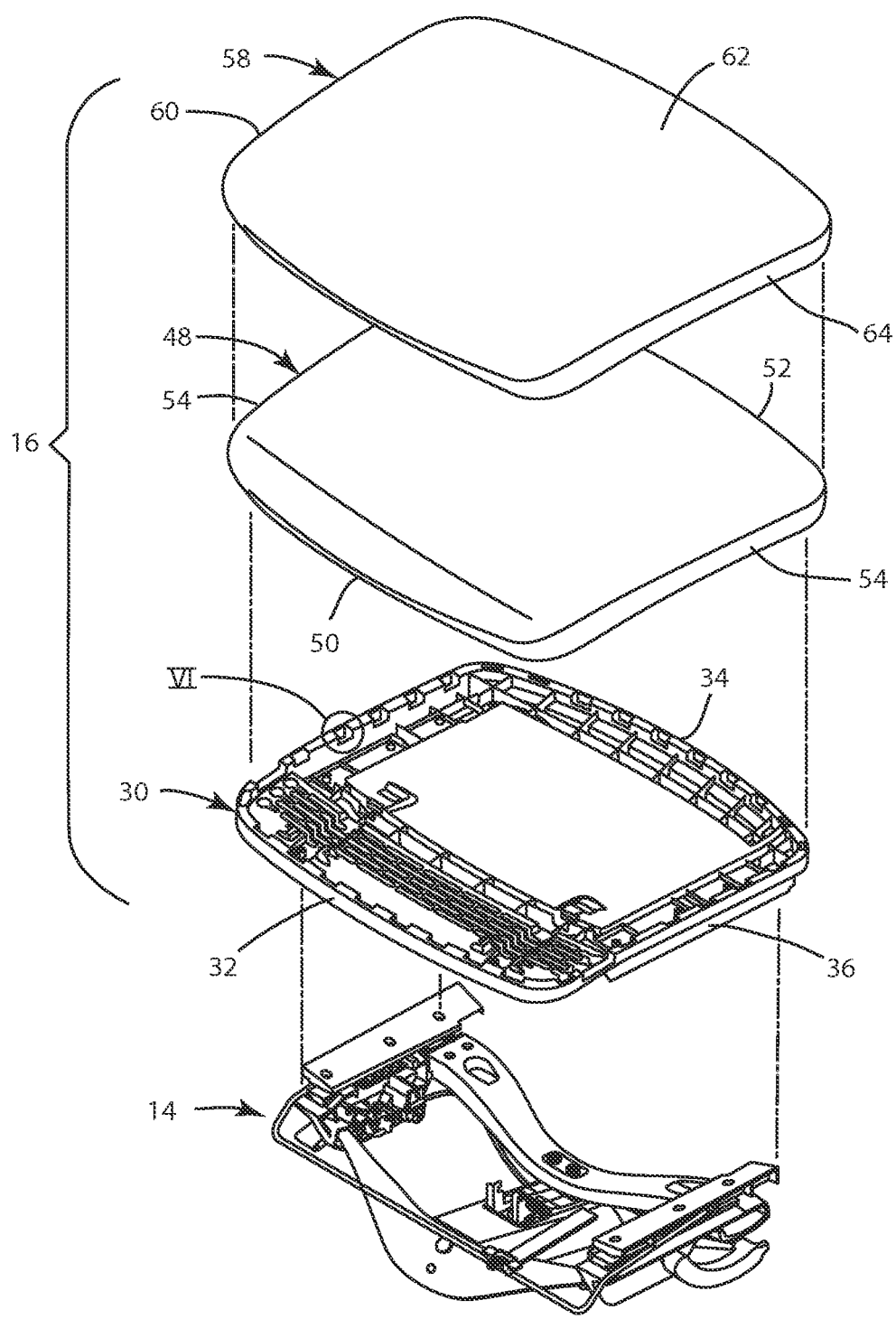
FIG. 4 is an exploded top perspective view of a control assembly and the seat assembly.
Figure 5:
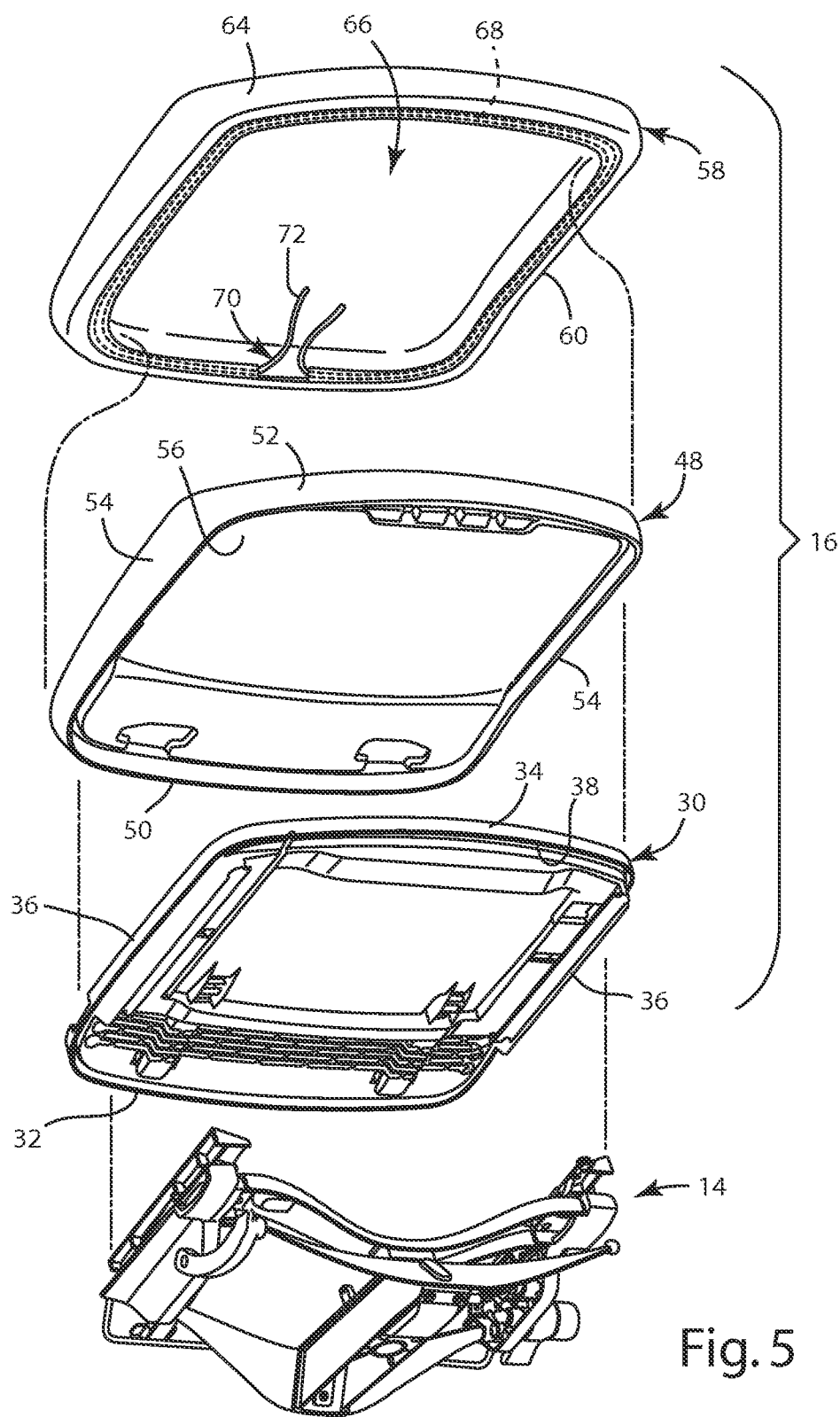
FIG. 5 is an exploded bottom perspective view of the control assembly and the seat assembly.
Figure 6:
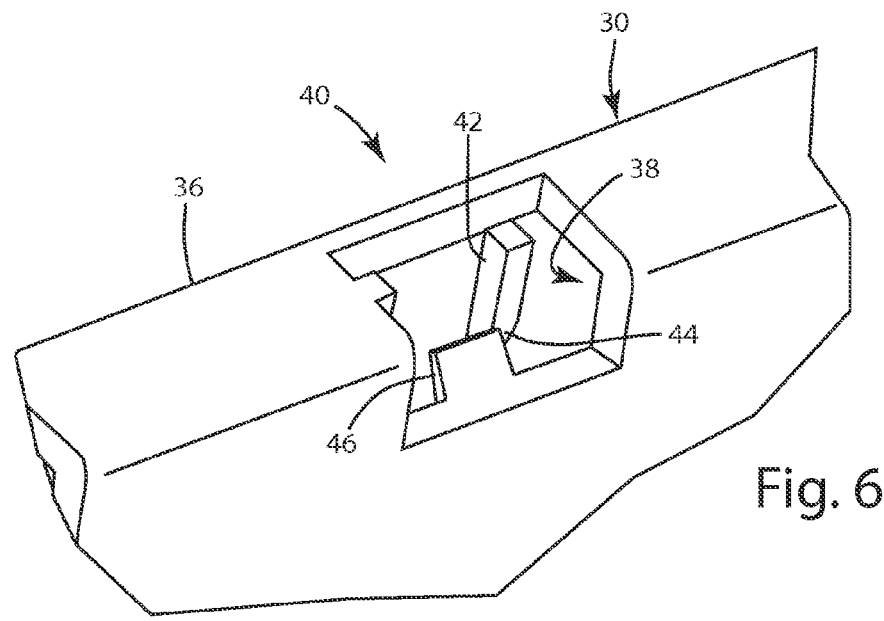
FIG. 6 is an enlarged perspective view of the area VI, FIG. 4.

The seat assembly 16 (FIGS. 4 and 5) includes a seat shell member 30 having a forward edge 32, a rearward edge 34, and a pair of side edges 36 extending between the forward edge 32 and the rearward edge 34, wherein the forward edge 32, the rearward edge 34 and the side edges 36 cooperate to form an outer periphery of the seat shell member 30. In the illustrated example, the seat shell member 30 comprises an integrally molded plastic unitary member, however, other suitable structures and materials may also be utilized. The seat shell member 30 further includes a downwardly opening channel 38 having a C-shaped cross-sectional configuration and extending about the periphery of the seat shell 30. A plurality of couplers 40 (FIG. 6) are integral with the seat shell 30, and are located within and spaced along the channel 38. Each coupler 40 includes a pair of ribs 42 each having a downwardly angled abutment surface 44. Each coupler 40 further includes a flexibly resilient engagement tooth 46 interspaced with the pair of ribs 42. The seat assembly 16 further includes a foam cushion member 48 having a forward edge 50, a rearward edge 52, and a pair of side edges 54 extending therebetween, wherein at least the forward edge 50, and the side edges 54 of the cushion member 48 cooperate to form a downwardly opening pocket 56 that receives a portion of the seat shell 30 therein. The seat assembly 16 further includes an upholstery cover assembly 58. In the illustrated example, the cover assembly 58 includes a cover 60 comprising a stretchable fabric and including an upper portion 62 and a plurality of side portions 64 extending about the upper portion 62 and which cooperate to define an interior space 66 that receives an assembly of the seat shell 30 and the cushion member 48 therein. The cover assembly 58 further includes a drawstring tunnel 68 extending about a peripheral edge of the side portions 64 and receiving a drawstring 70 therein, wherein the drawstring 70 includes a pair of free ends 72 extending from the drawstring tunnel 68.

In assembly, the seat shell 30 (FIG. 7A) and the cushion member 48 are located within the interior space 66 of the upholstery cover assembly 58 such that the drawstring tunnel 68 (FIG. 8A) and the drawstring 70 are located within the channel 38 and such that the drawstring tunnel 68 and drawstring 70 impinge upon the ribs 42 and are engaged by the teeth 46, thereby securing the drawstring tunnel 68 and the drawstring 70 within the channel 38.

Figure 8A:
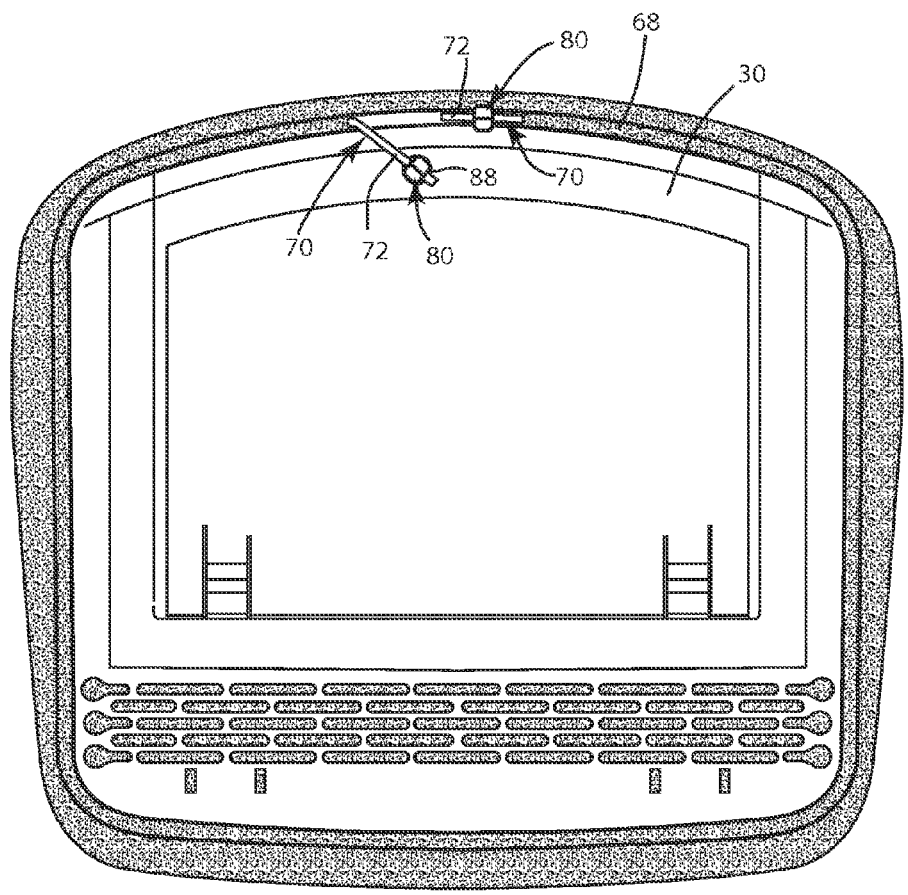
FIG. 8A is a bottom plan view of the seat assembly.
Figure 8B:
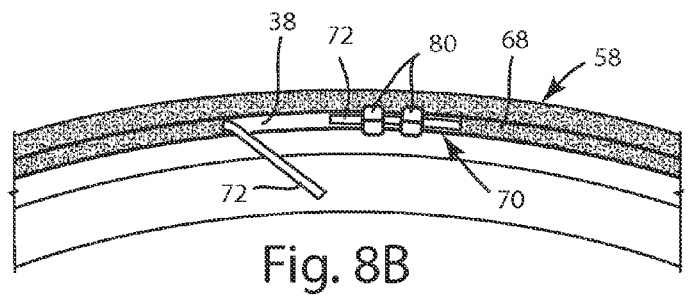
FIG. 8B is a partial bottom plan view of an alternative embodiment of the seat assembly.
Figure 8C:
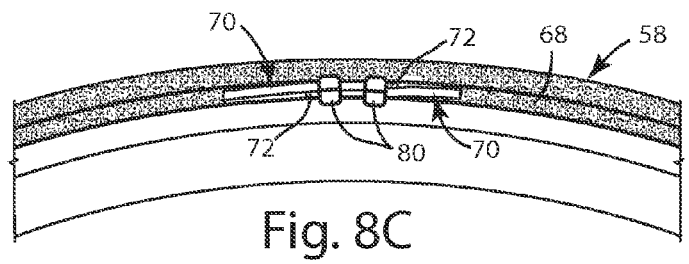
FIG. 8C is a partial bottom plan view of another alternative embodiment of the seat assembly.
Figure 9A:
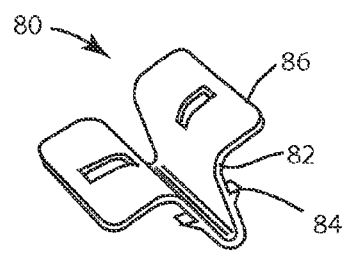
FIG. 9A is a perspective view of a clip.
Figure 9B:
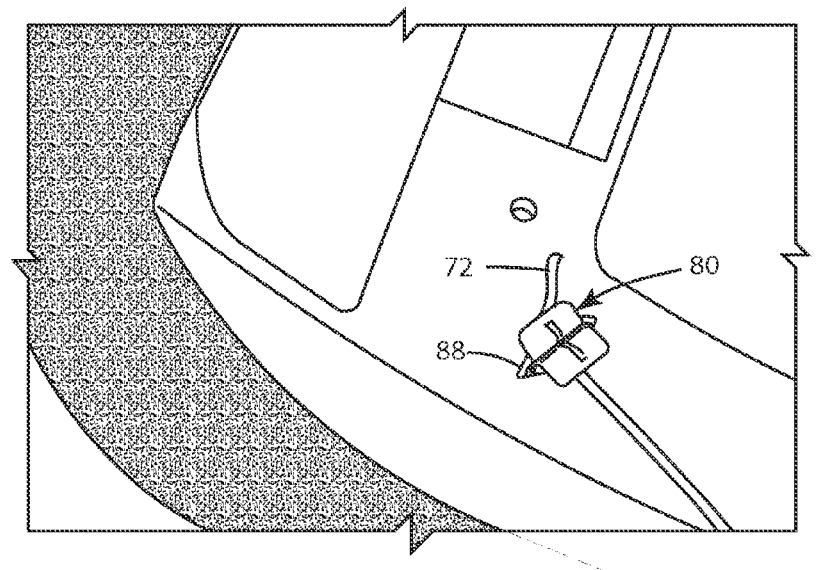
FIG. 9B is a perspective view of the clip and seat assembly in an assembled configuration.
Figure 9C:
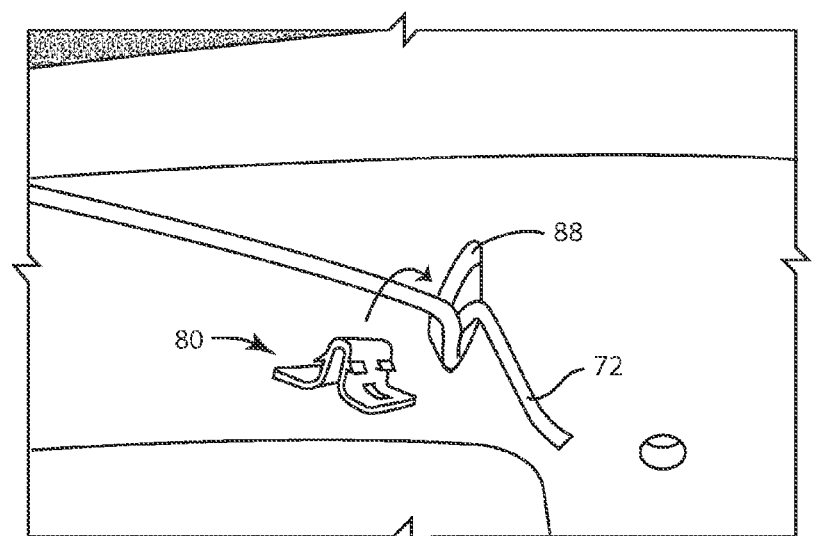
FIG. 9C is a perspective view of the clip and seat assembly in an unassembled configuration.

As best illustrated in FIG. 8A, the free ends 72 of the drawstring 70 are secured to the seat shell 30 by a fastener or clip member 80 (FIG. 9A). In the illustrated example, the clip member 80 is a spring clip having U-shaped spring body 82 having engagement teeth 84 spaced along the length thereof, and a pair of flanges 86 extending outwardly from the sides of the U-shaped spring body 82. In assembly, the clip 80 (FIGS. 8B and 8C) is vertically aligned with a respective free end 72 of the drawstring 70, and is then inserted into a portion of the channel 38 of the seat shell 30, thereby holding the free end 72 of the drawstring 70 within the channel 38. Alternatively, the clip member 80 (FIG. 8A) can engage a separate aperture 88 within the seat shell member 30, thereby securing at least a portion of the free end 72 of the drawstring 70 within the aperture 88. Alternatively, multiple clip members 80 (FIG. 8B) may be used to secure one of the free ends 72 of the drawstring 70 within the channel 38. As best illustrated in FIG. 8C, another alternative embodiment includes the securement of two free ends 72 of a drawstring 70 by a single clip 80.

The reference numeral 16a (FIG. 7B) generally designates another embodiment of the seat assembly. Since the seat assembly 16a is similar to the previously described seat assembly 16, similar parts appearing in FIG. 7B and FIG. 7A, respectively, are represented by the same, corresponding reference numeral, except for the suffix "a" in the numerals of the latter. In the illustrated example, the seat assembly 16a includes the seat shell 30a and the cushion member 48a located within the interior space 66a of the upholstery cover assembly 58a such that a stile or extrusion 73a is located within the channel 38a, thereby securing the cover assembly 58a to the seat shell 30a. As illustrated, the elastically deformable extrusion 73a has a J-shaped cross-sectional configuration, including a hook portion 75a that snappingly engages the teeth 46 upon insertion of the extrusion 73a into the channel 38a. The cover 60a is preferably sewn to the extrusion 73a, however, other suitable connection methods may also be utilized.

The back assembly 18 (FIGS. 10 and 11) includes a substantially rigid peripheral frame 90 that includes a laterally extending top portion 92, a laterally extending bottom portion 94, and a pair of vertically extending side portions 96, wherein the top portion 92, the bottom portion 94 and the side portions 96 cooperate to form a central opening 98. The back assembly 18 further includes a lumbar support assembly 100 adapted to support a lumbar area of a seated user and received within slots 102 extending vertically along each of the side portions 96 of the peripheral frame 90. A pair of side extensions 104 extend vertically along and are received within pockets 106 of the side portions 96 and are secured thereto by a plurality of mechanical fasteners 107.

Figure 12:
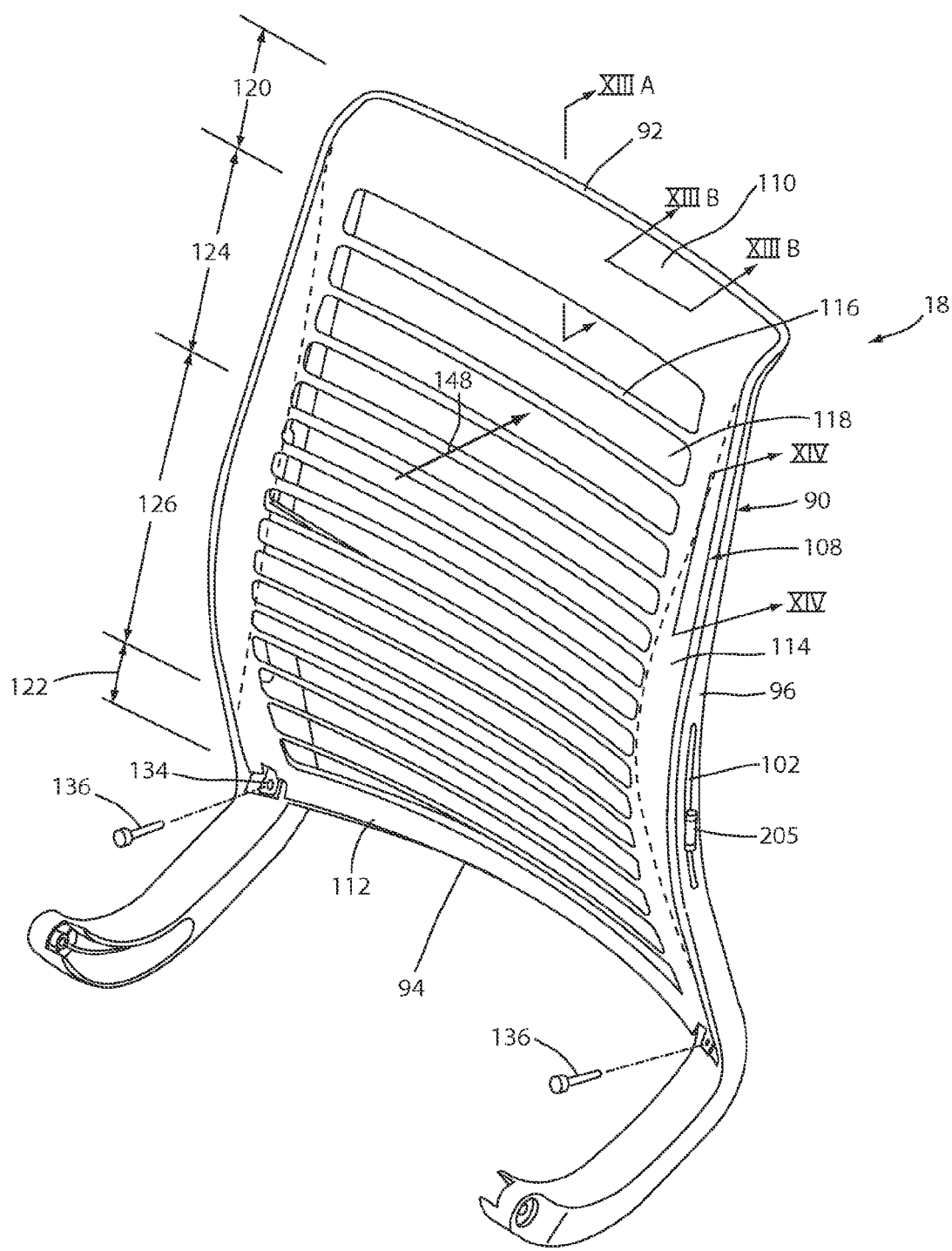
FIG. 12 is a front perspective view of the back assembly.
Figure 13A:
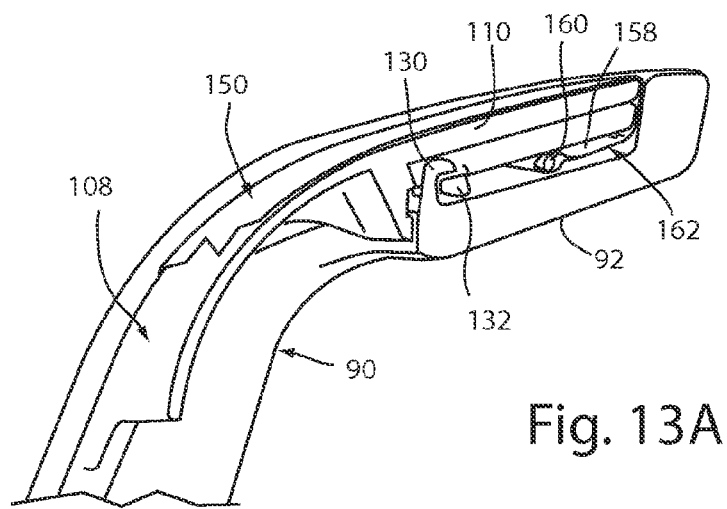
FIG. 13A is a cross-sectional side view across the line XIIIA-XIIIA, FIG. 12.
Figure 13B:
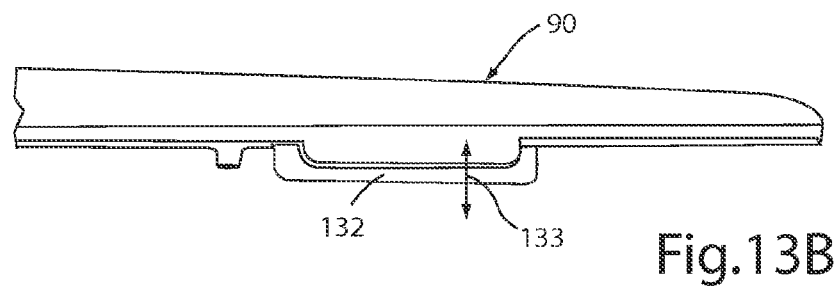
FIG. 13B is a cross-sectional side view across the line XIIIB-XIIIB, FIG. 12.
Figure 14:
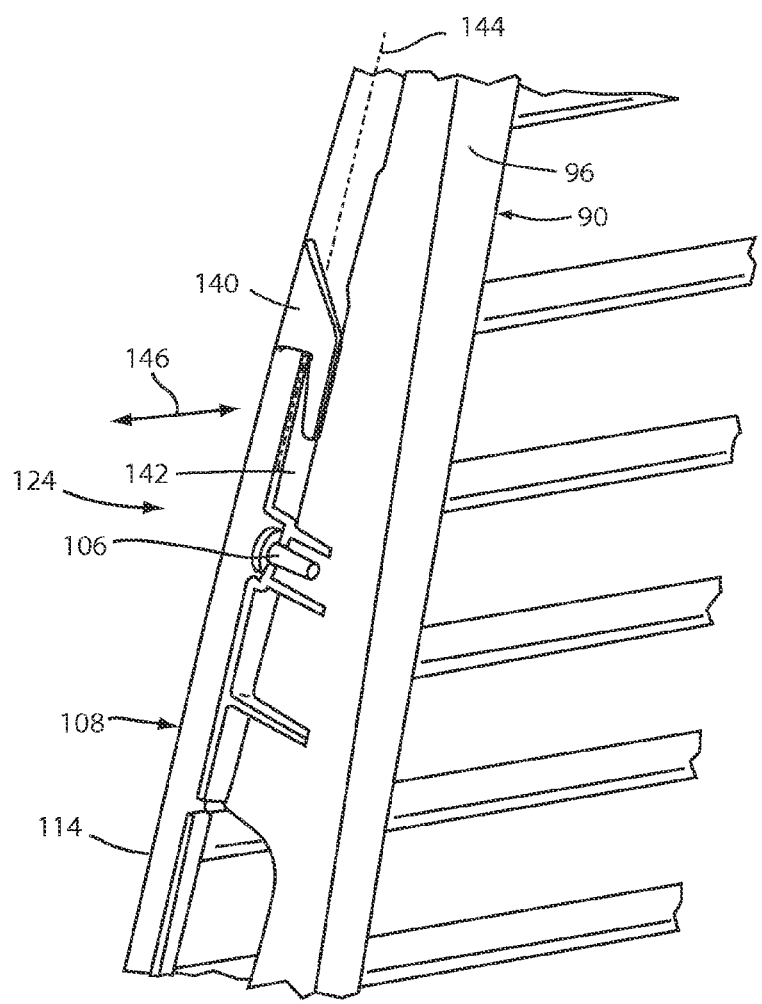
FIG. 14 is a cross-sectional side view across the line XIV-XIV, FIG. 12.

The back assembly 18 further includes a substantially flexible back shell 108 including a top portion 110, a bottom portion 112, and a pair of side portions 114 that align with the top portion 92, the bottom portion 94 and the side portions 96 of the peripheral frame 90, respectively and as described below. The back shell 108 further includes a plurality of vertically spaced slats 116 extending between the side portions 114 and defining a plurality of slots 118 therebetween. In assembly, the back shell 108 (FIG. 12) is attached to the peripheral frame 90 in such a manner so as to define vertically spaced zones or regions of differing flexibility for the back shell 108. Specifically, the back shell 108 is attached to the peripheral frame 90 such that a top region 120 and a bottom region 122 of the back shell 108 are fixed with respect to the peripheral frame 90, a third region 124 of the back shell 108 is constrained with respect to the peripheral frame 90 in a forward direction, and a fourth region 126 of the back shell 108 is free to separate from the peripheral frame 90 in a forward direction, wherein the flexed state of the back shell 108 is shown in dashed line. More specifically, and as best illustrated in FIGS. 13A and 13B, the top portion 92 of the peripheral frame 90 includes a plurality of upwardly-extending hooks 130 integral with and spaced across the top portion 92, while the top portion 110 of the back shell 108 includes a plurality of downwardly-extending flexibly resilient loops 132 integral with the top portion 110, wherein the hooks 130 engage the loops 132, thereby flexing the loops 132 in a direction 133 during engagement and fixedly securing the top portion 110 of the back shell 108 to the top portion 92 of the peripheral frame 90. As best illustrated in FIG. 12, the back shell 108 includes a pair of integral tab members 134 located at the intersection of the side portions 114 and the bottom portion 112, wherein the tab members 134 are secured to peripheral frame 90 by mechanical fasteners such as bolts 136, thereby fixedly securing the bottom portion 112 of the back shell 108 to the bottom portion 94 of the peripheral frame 90. As best illustrated in FIG. 14, the third region 124 of the back shell 108 includes rearwardly and downwardly extending hooks 140 located along the length and integral with the side portions 114 of the back shell 108. Each hook 140 is received within a pocket 142 formed between the side extensions 104 and the side portions 96, such that the back shell 108 is pivotable about a pair of axis 144 extending vertically through the corresponding hooks 140. The pockets 142 located within the third region 124 are also sized so as to allow lateral displacement of the hooks 140 within the pockets 142 in a direction 146 so as to allow the side portions 114 of the back shell 108 to flex inwardly with respect to the side portions 96 of the peripheral frame 90 thereby in turn, allowing increased flexibility and compliance of the back shell 108 in a rearward direction 148 with respect to the peripheral frame 90. The side portions 114 of the back shell 108 located within the fourth region 126 are not secured to the side portions 96 of the peripheral frame 90, thereby allowing maximum compliance and flexibility of the back shell 108 with respect to the peripheral frame 90 in both the lateral direction 146 and in the rearward direction 148. As a result, the first and second regions 120, 122 of the back shell 108 are constrained from movement with respect to the peripheral frame 90, the third region 124 allows limited compliance of the back shell 108 with respect to the frame 90, while the fourth region 126 allows for maximum flexure of the back shell 108 with respect to the frame 90.

Figure 11A:
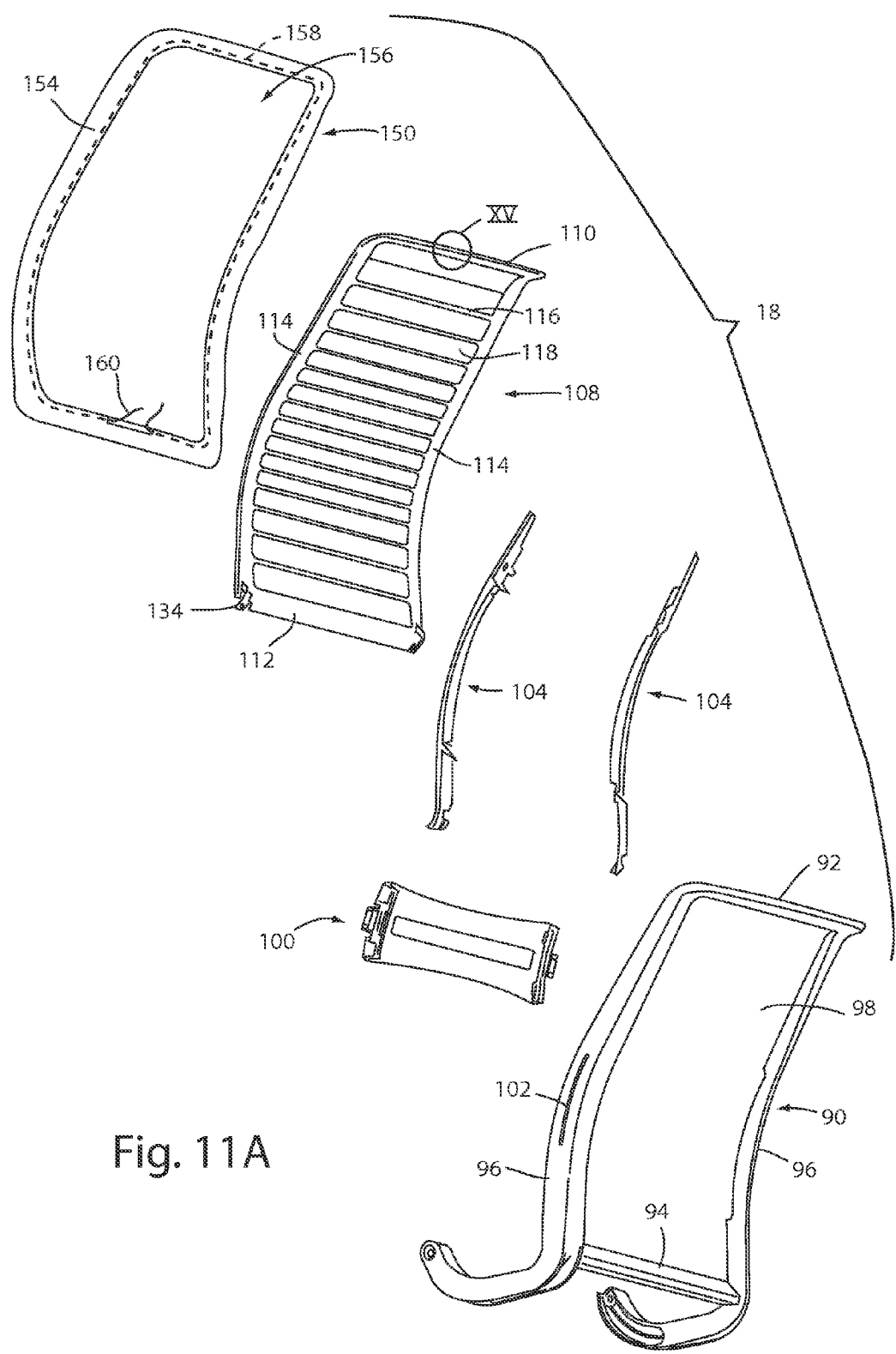
FIG. 11A is an exploded back perspective view of the back assembly.

The reference numeral 18b (FIG. 11B) generally designates another embodiment of the back assembly. Since the back assembly 18b is similar to the previously described back assembly 18, similar parts appearing in FIGS. 11B and 11A, respectively, are represented by the same, corresponding reference numeral, except for the suffix "b" in the numerals of the latter. In the illustrated example, the upholstery cover assembly 150b includes a drawstring 160b and a plurality of stiles or extrusions 151b attached to and extending along the side portions 154b of the cover assembly 150b. As best illustrated in FIG. 11C, each extrusion 151b has a J-shaped cross-sectional configuration that is secured to the cover assembly 150b via a stitch 153b, and that includes a hook portion 155b that engages the teeth 168b of the couplers 162b of the back shell 108b. The drawstring 160b is located within a drawstring tunnel 158b that is secured to the associated side portion 154b via a stitch 157b and is drawn about the back shell 108b subsequent to the extrusions 151b being secured to the back shell 108b. The free ends 163b of the drawstring 160b are secured to one another via a ferrule 165b. In the illustrated example, the drawstring 160b is relatively incompressible and is comprised of a single strand polypropylene material, although materials such as nylon as well as multistrand constructions may also be utilized.

Figure 10:
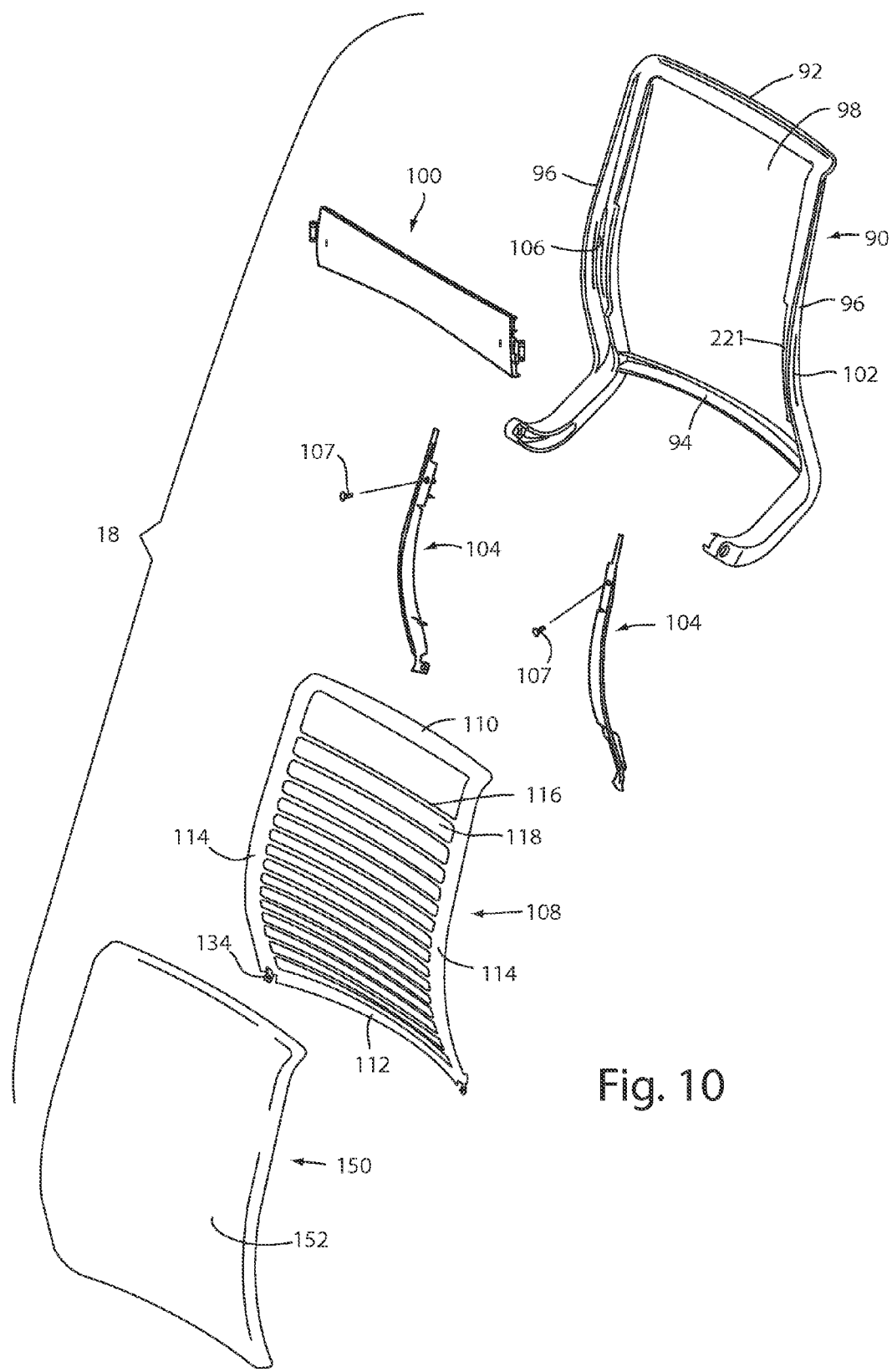
FIG. 10 is an exploded front perspective view of the back assembly.
Figure 19:
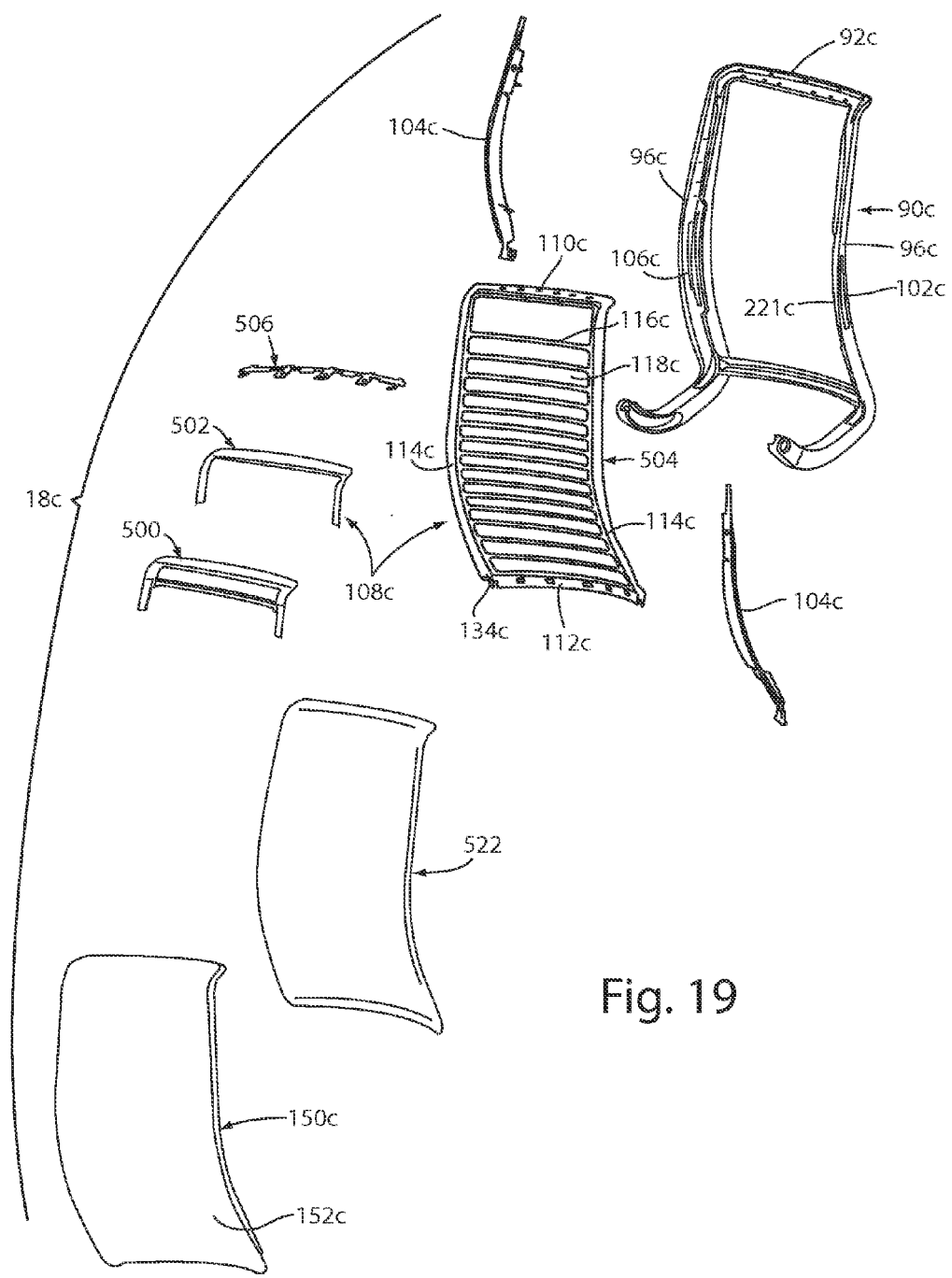
FIG. 19 is an exploded perspective view of an alternative embodiment of the back assembly.
Figure 20:
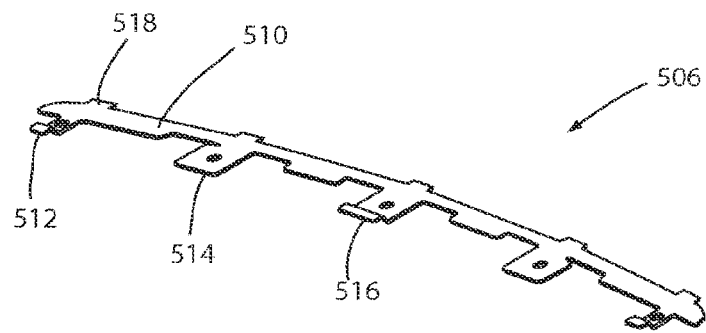
FIG. 20 is a perspective view of a structural reinforcement member of the alternative back assembly of FIG. 19.
Figure 21:
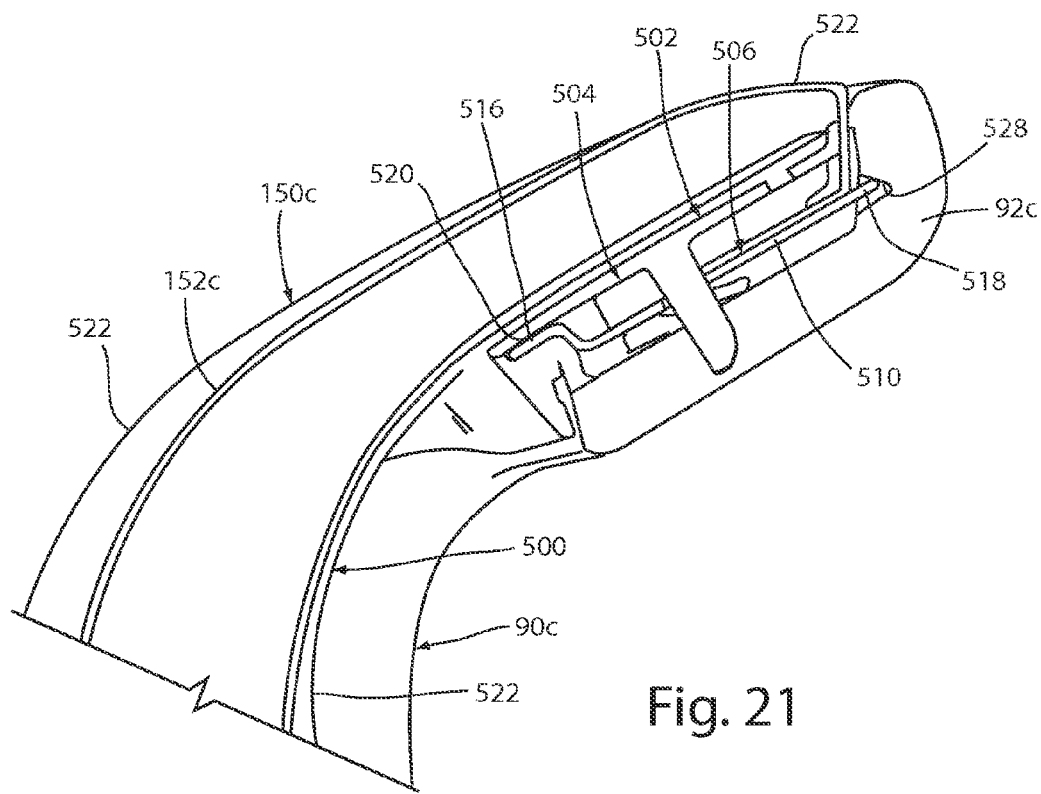
FIG. 21 is a cross-sectional view of a top portion of the alternative embodiment of the back assembly of FIG. 19.

The reference numeral 18c (FIG. 19) generally designates another embodiment of the back assembly. Since the back assembly 18c is similar to the previously described back assembly 18, similar parts appearing in FIG. 10 and FIG. 19 are identified by the same, corresponding reference numerals except for the suffix "c" in the numerals of the latter. In the illustrated example, the back assembly 18c includes a rigid back frame 90c, a top cover member 500 covering an upper portion of the back shell 108c that includes an upper portion 502 and a separate lower portion 504. A plate member 506 (FIGS. 20 and 21) extends laterally across the upper portion 92c of the back frame 90c and is positioned between the upper portion 92c of the back frame 90c and the back shell 108c, as described below. As best illustrated in FIGS. 20 and 21, the plate member 506 includes an elongated body portion 510, a pair of outwardly located, forwardly-extending alignment tabs 512, a pair of forwardly-extending connection tabs 514, a centrally positioned, forwardly-extending alignment tab 516, and a plurality of rearwardly-extending engagement tabs 518. Each of the alignment tabs 512, the connection tabs 514 and the alignment tabs 516 are received within corresponding apertures 520 (FIG. 21) formed between the upper portion 502 and the lower portion 504 of the back shell 108c.

As best illustrated in FIG. 21, the upholstery assembly 150c includes a fabric or mesh fabric 522, and a thin foam layer 522. The plate member 506 (FIG. 21) is positioned such that an edge of the fabric 522 is trapped between the plate member 506 and the lower portion 504 of the back shell 108c, and the plate member 506 is then heat staked to the lower portion 504 of the back shell 108c and separately to the upper portion 502 of the back shell 108c, thereby structurally coupling the upper portion 502 to the lower portion 504 through the plate member 506. It is noted that the structurally reinforcing plate member 506 is coupled to the back frame 90c subsequent to the fabric 522 being secured about the back shell 108c. The back shell 108c is secured to the back frame 90c by engaging each of the engagement tabs 518 into a corresponding groove 528 located within the upper portion 92c of the back frame 90c, such that the plate member 506 properly aligns the back shell 108c with the back frame 90c assuring proper fit and finish for the aesthetics of the chair.

Figure 13C:
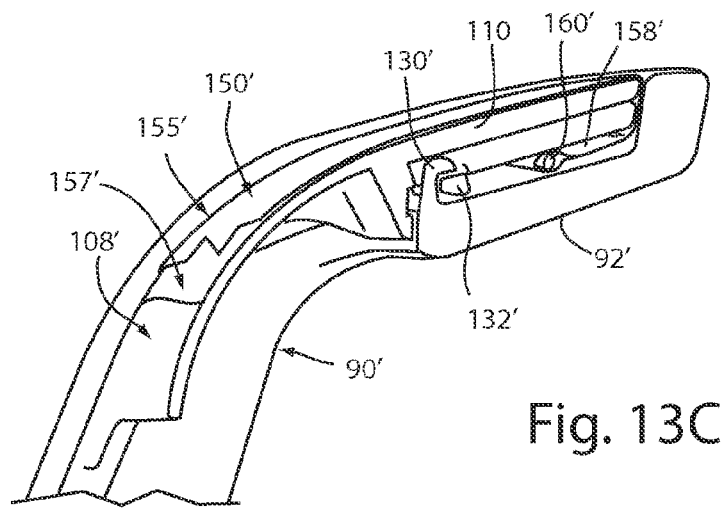
FIG. 13C is a cross-sectional side view of an alternative embodiment of the back assembly.

The back assembly 18 further includes a back upholstery cover assembly 150 having a front portion 152 and a plurality of side portions 154 that cooperate to form an interior space 156 that receives the back shell 108 therein. The upholstery assembly 150 is comprised of a stretchable fabric material and includes a drawstring tunnel 158 that extends about an inner periphery of the side portions 154 and houses a drawstring 160 therein. As best illustrated in FIG. 13A, the upholstery assembly 150 receives a portion of the back shell 108. Alternatively, the upholstery assembly 150' (FIG. 13C) extends about a portion of the back shell 108', a foam cushion member 155', and an inner fabric layer 157' which separates the cushion member 155' from the back shell 108'.

Figure 15:
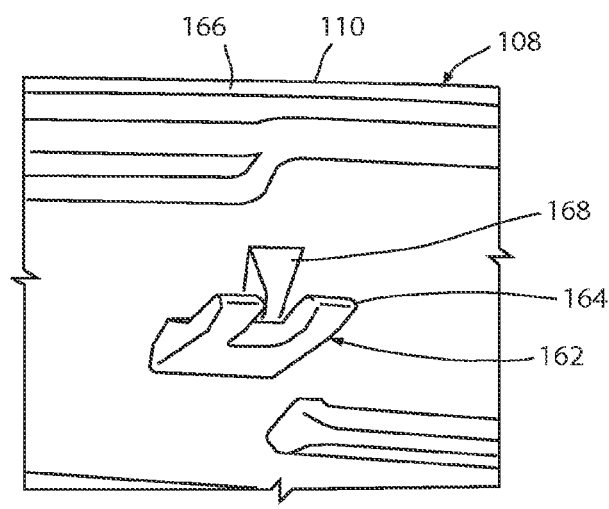
FIG. 15 is an enlarged perspective view of the area XV, FIG. 11A.

As best illustrated in FIGS. 13A and 15, the back shell 108 includes a plurality of couplers 162 spaced about the periphery of the back shell 108. In the illustrated example, each coupler 162 includes a pair of outwardly-extending fingers 164 that are formed so as to define an opening facing an outer peripheral edge 166 of the back shell 108. A plurality of flexibly resilient teeth 168 are interdigitated with the fingers 164 of the coupler 162. In assembly, the upholstery assembly 150 wraps about the edges of the back shell 108 such that the drawstring tunnel 158 and the drawstring 160 are received within the couplers 162 and engaged by the teeth 168, thereby retaining the drawstring tunnel 158 and the drawstring 160 within the associated couplers 162.

Figure 16:
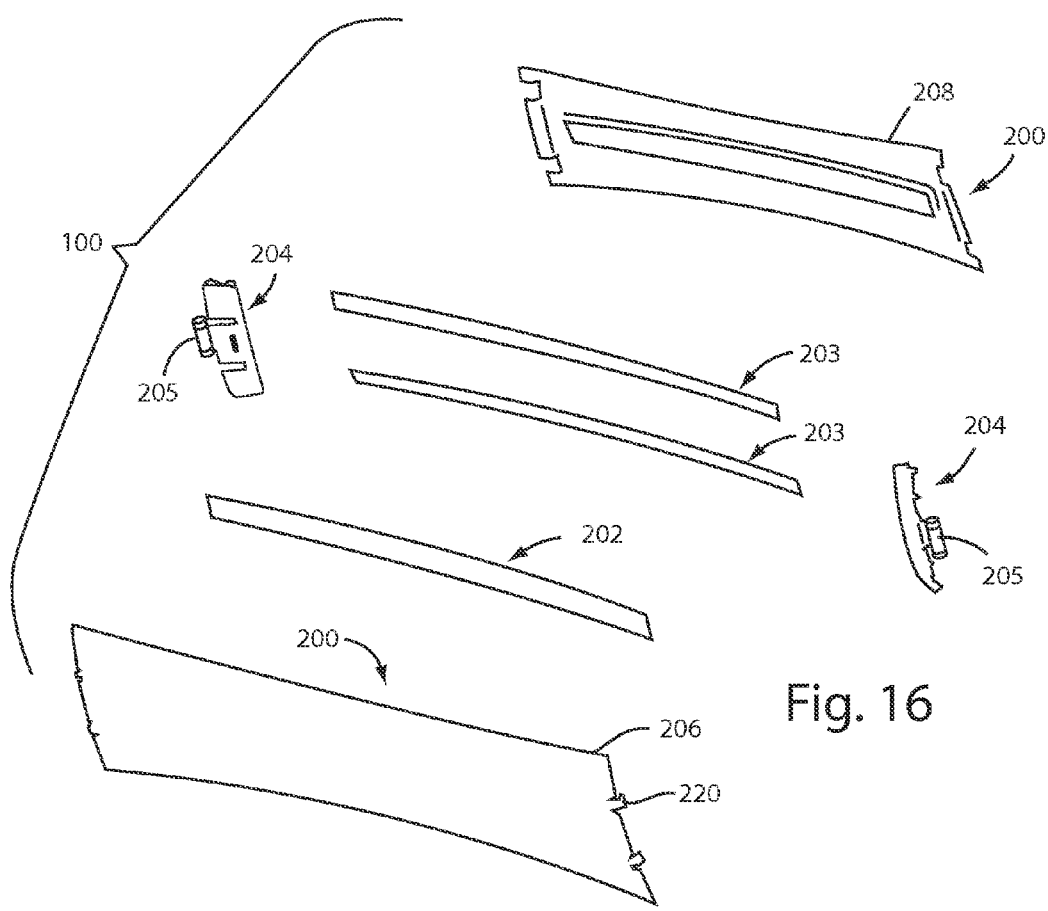
FIG. 16 is an exploded front perspective view of the lumbar assembly.
Figure 17:
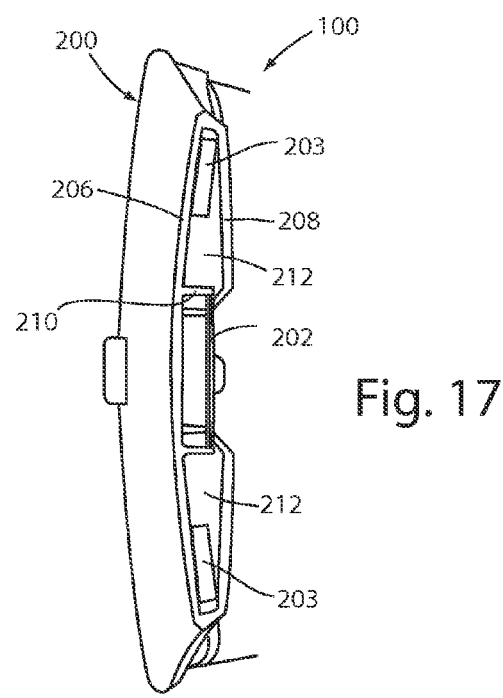
FIG. 17 is a cross-sectional side view of a lumbar assembly.
Figure 18A:
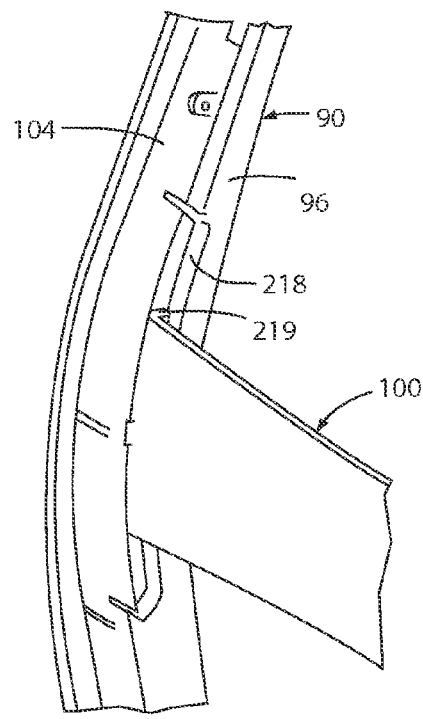
FIG. 18A is an enlarged perspective view of an engagement of the lumbar assembly with a back frame assembly.
Figure 18B:
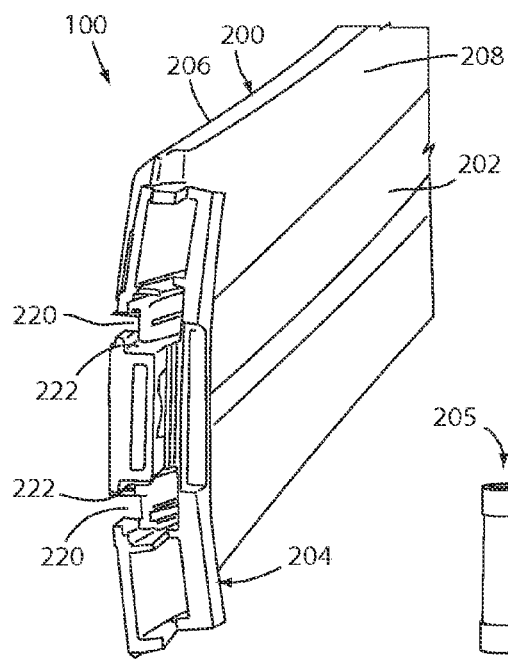
FIG. 18B is an enlarged perspective, cross-sectional view of a handle assembly and housing of the lumbar assembly.
Figure 18C:
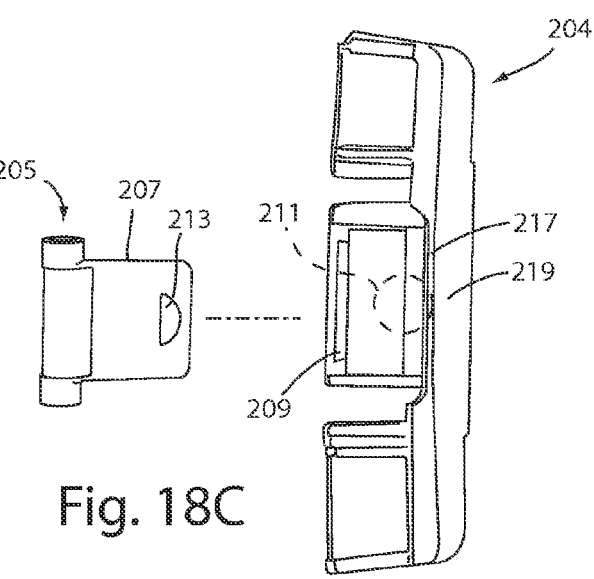
FIG. 18C is an exploded perspective view of the handle assembly and housing.

The lumbar assembly 100 (FIGS. 10, 11A and 16) includes a body shell 200 housing a laterally extending decorative plate 202, a pair of lateral extending leaf springs 203, a pair of sliding connection assemblies 204, and a pair of adjustment handles 205 configured for grasping by a user to move the lumbar assembly 100 between a lowered position E (FIG. 2) and a raised position F. The molded body shell 200 includes a front portion 206 and a back portion 208 arcuately shaped and vibrationally welded to one another in a back-to-back relationship to form a pocket 210 (FIG. 17) which receives the decorative plate 202 therein. Alternatively, other methods of coupling the front and back portions 206, 208 may be utilized, including mechanical fasteners such as screws, snaps, ultra sonic welding, adhesives, and the like. The leaf springs 203 extend along the length of the body shell 200 and are located within respective pockets 212 juxtaposed from one another across the pocket 210. The leaf springs 203 are adapted to provide a forward biasing force against a rearward force exerted by a lumbar area of a seated user's back. The sliding connection assemblies 204 are attached to the ends of the lumbar assembly 100 and are slidably received with an elongated relief 218 (FIG. 18A) formed between the receptive side portion 96 of the peripheral frame 90 and the side extensions 104, such that the lumbar assembly 100 is vertically movable between the lowered and raised positions E, F. Specifically, the body shell 200 includes a pair of vertically extending ribs 219 that guide along the respective side extensions 104, thereby centering the lumbar assembly 100 with respect to the frame 90. It is noted that the relative width of peripheral frame 90 changes along the path the lumbar assembly 100 travels when vertically adjusted, thereby requiring a sliding connection between the sliding connection assemblies 204 and the body shell 200. As best illustrated in FIG. 18B, each end of the front portion 206 of the body shell 200 includes a pair of barrel-headed tabs 220 slidably received within a pair of corresponding slots 222 which allows for sliding adjustment between the connection assemblies 204 and the body shell 200 while preventing the body shell 200 from disengaging the connection assemblies 204. In assembly, and as best illustrated in FIGS. 12A and 18C, each handle 205 includes a blade portion 207 that is slidably received within a corresponding pocket 209 of the connection assembly 204 and is held therein by a flexibly resilient tab 211 that engages an aperture 213 of the blade portion 207, thereby slidably securing the lumbar assembly 100 within the slots 102. Each connection assembly 204 further includes a flexibly resilient bar 217 with a pawl member 219 that selectively engages a plurality of detents 221 (FIG. 10) vertically spaced along the side portion 102 of the frame 90, thereby holding the lumbar assembly 100 in a selected vertical position with respect to the frame 90.

Figure 3:
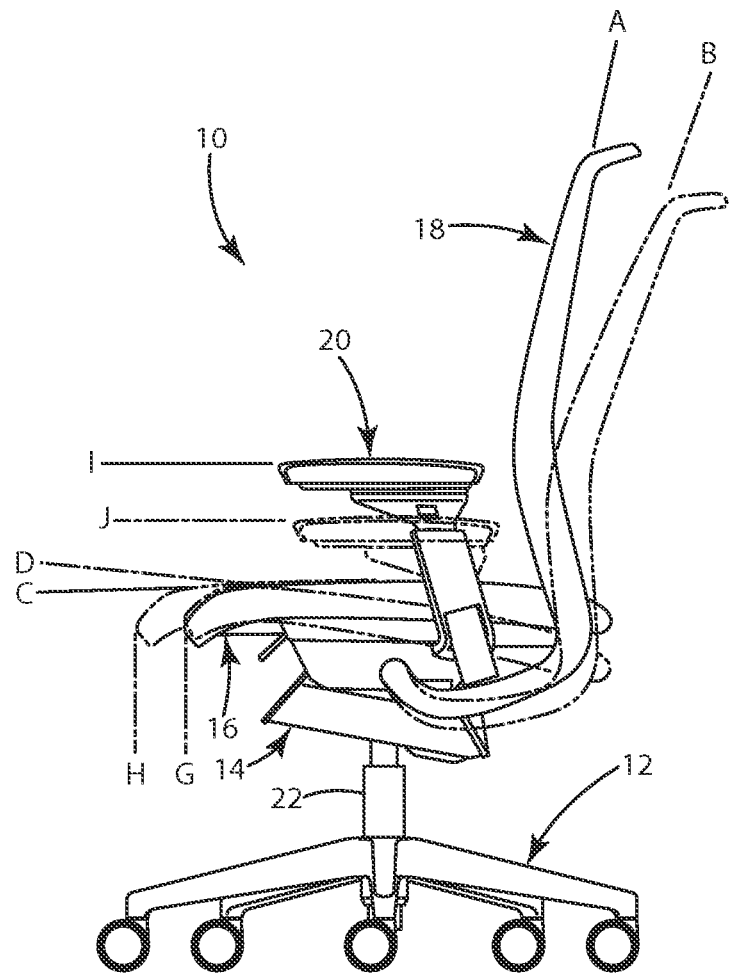
FIG. 3 is a side elevational view of the chair assembly showing a back assembly and a seat assembly in upright and reclined positions, and the seat assembly in retracted and extended positions.
Figure 22:
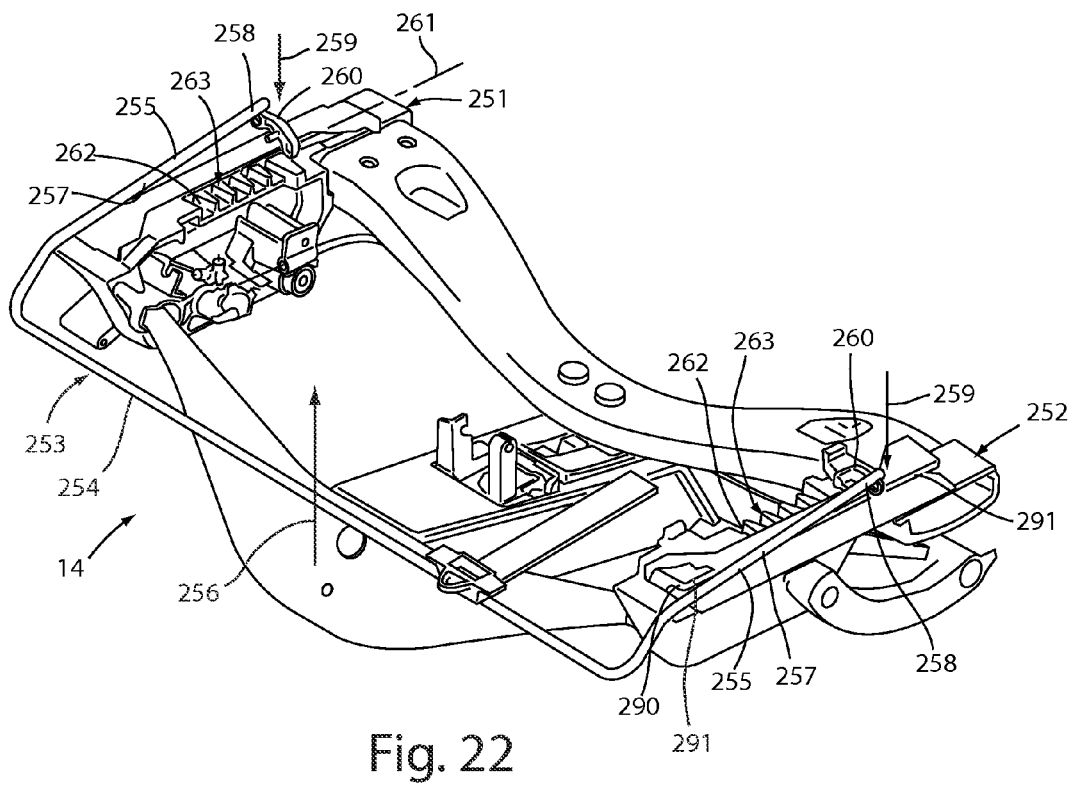
FIG. 22 is a perspective view of the control assembly.

As best illustrated in FIG. 3, the seat assembly 16 is movable between a retracted position G and an extended position H, thereby providing depth adjustment for the chair assembly 10. The seat assembly 16 (FIGS. 4 and 5) is slidably supported on the control assembly 14. The control assembly 14 (FIG. 22) includes support plates 251, 252 disposed on opposite sides of the overall control assembly 14. The control assembly 14 further includes an actuator bar 253 which is generally U-shaped and includes a handle portion 254 disposed under a front portion of the seat assembly 16 and adapted to be grasped by a user, and a pair of arm portions 255 extending rearwardly from the handle portion 254. Upon actuating the actuator bar 253, the handle portion 254 is lifted upward in a direction 256, wherein the actuator bar 253 pivots in the seat shell 30 at pivot point 257 which causes the distal ends 258 of the arm portions 255 to move downward in a direction 259 to engage corresponding rockers 260 which are pivotably connected to the seat shell 30 about pivot axis 261. The actuation of the actuator bar 253 moves the rockers 260 from an engaged position to a disengaged position, thereby allowing movement of the seat assembly 16 between the retracted and extended positions G, H. Specifically, the rockers 260 selectively engage a plurality of reliefs 262 of corresponding racks 263, thereby allowing the seat assembly 16 to be selectively locked at positions between the retracted and extended positions.

Figure 7A:
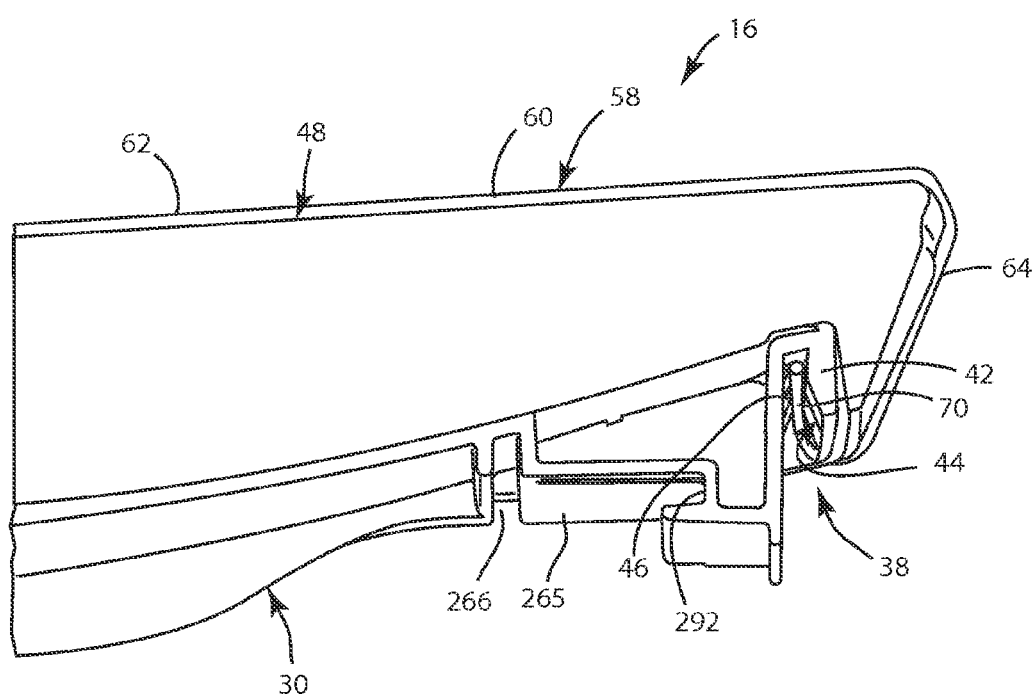
FIG. 7A is a cross-sectional front elevational view of the seat assembly.
Figure 23:
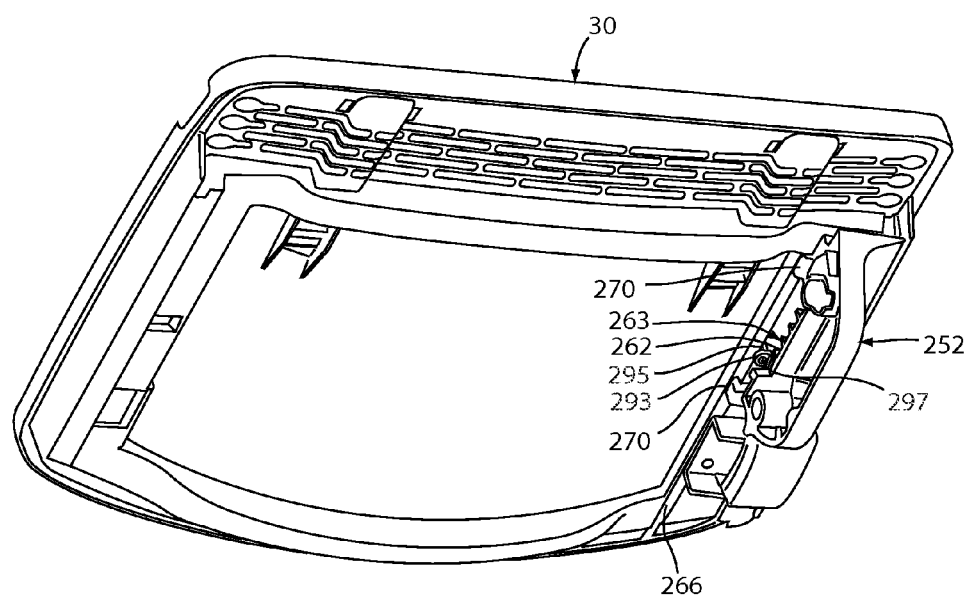
FIG. 23 is a bottom perspective view of a seat shell and rack member.

As shown in FIGS. 7A and 23, the bottom surface 265 of the seat shell 30 includes a downwardly opening integral linear guide bearing channel 266 extending front-to-back of the seat shell 30. As best illustrated in FIG. 20, the support plate 252 includes a pair of upwardly-extending guide portions 270 that slidably track within the linear bearing 266 of the seat shell 30, thereby linearly guiding the seat shell 30 with respect to the support plate 252 and the overall control assembly 14. The support plate 252 includes an L-shaped guide portion 290 (FIG. 22) housed in a bearing member 291, which is received within a corresponding inwardly-opening slot 292, such that the guide portion 290 of the support plate 252 guides within the slot 292 as the seat assembly is moved between the retracted and extended positions G, H.

Alternatively, a removable stop member 293 may be secured to an underside of the seat shell 30 at a position such that the stop member abuts a portion 295 of the support plate 251, thereby limiting the amount of travel of the seat assembly 16 from the extended position to the retracted position and preventing the seat assembly 16 from moving to the rearward-most position. In the illustrated example, the stop member 293 is secured to the seat shell 30 via a screw 297, thereby requiring the use of a tool for installation and removal.

Figure 24:
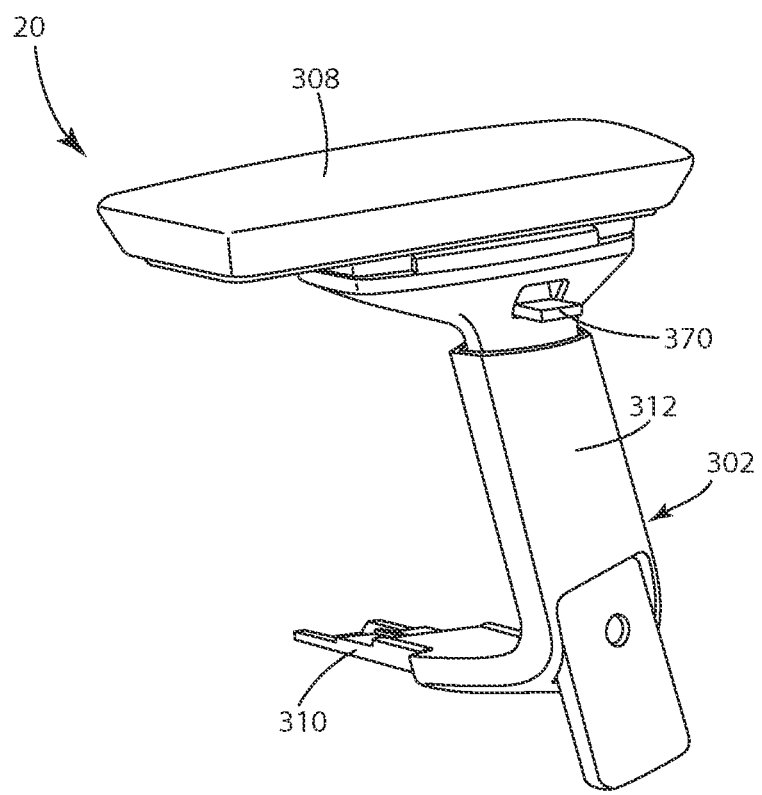
FIG. 24 is a side perspective view of an armrest.

Each armrest assembly 20 (FIGS. 3, 24 and 25) is vertically adjustable between a raised position I and a lowered position J and includes a tubular support 300 constructed for attachment to a chair 10, an armrest assembly 302 telescopingly positioned in the tubular support, and a height adjustment mechanism 304 slidably received in the armrest assembly. A plate 306 is attached to the top of the armrest assembly 302 and an arm cap 308 is attached to the plate 306. In an alternative embodiment, a pivot/slide member 309 may be attached to the plate and the arm cap 308 attached to the pivot/slide member. The pivot/slide member is similar to that disclosed in co-assigned U.S. Pat. No. 5,971,484,filed Dec. 3, 1997,entitled "ADJUSTABLE ARMREST FOR CHAIRS," the contents of which are incorporated herein by reference for its teachings.

Figure 25:
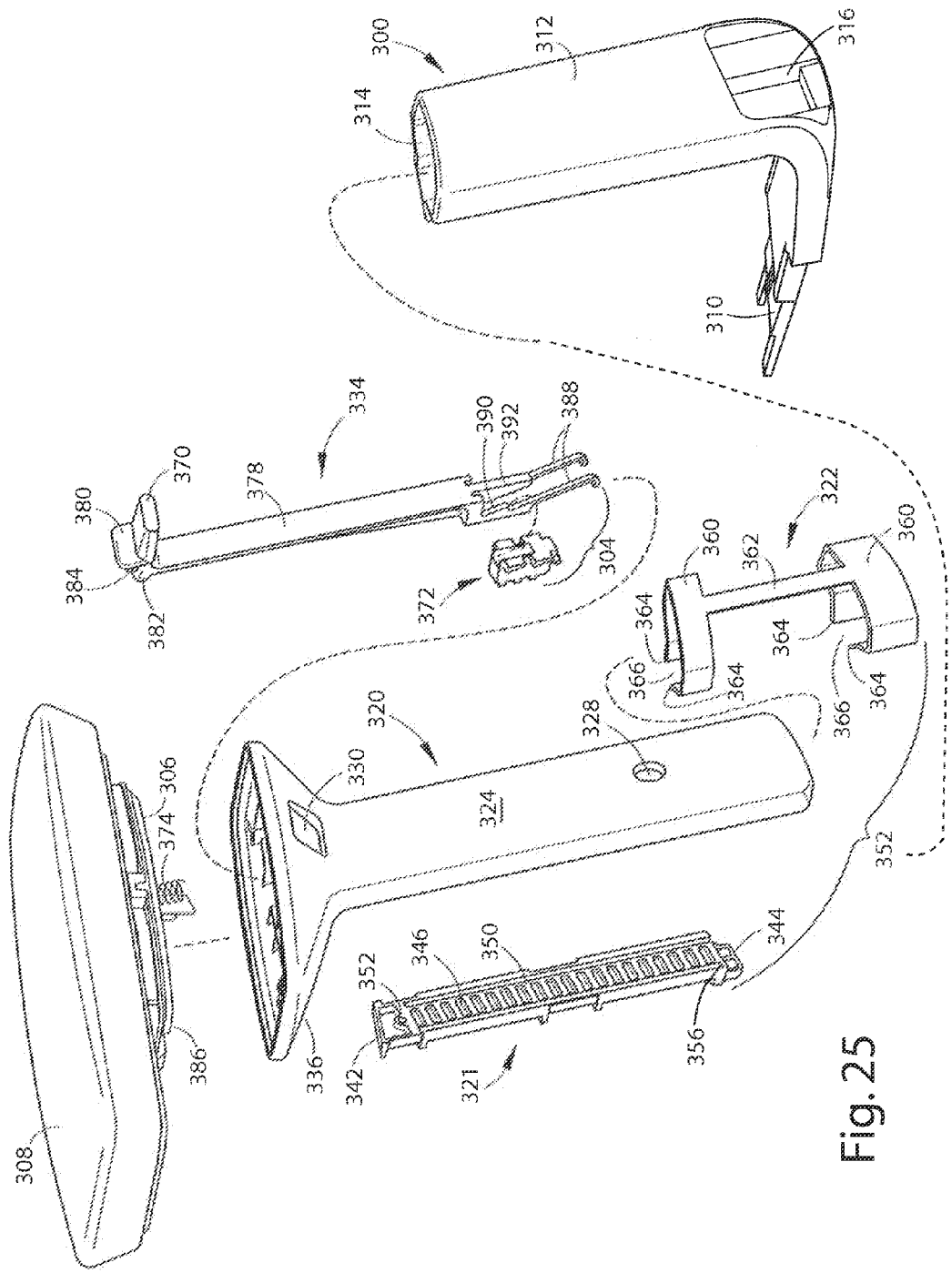
FIG. 25 is an exploded view of the armrest.
Figure 26:
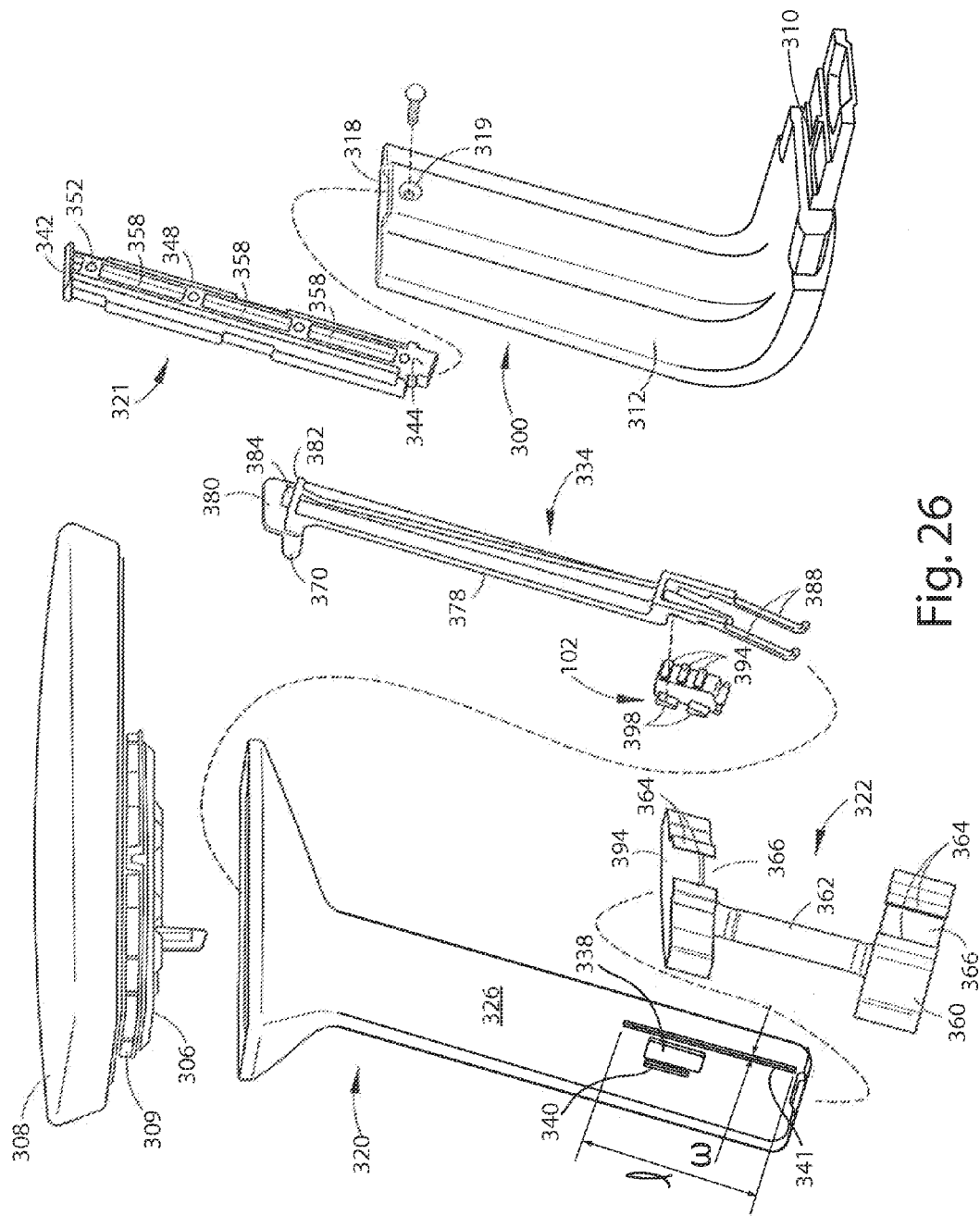
FIG. 26 is an exploded side perspective view of an armrest.

Referring to FIGS. 25 and 26, the tubular support 300 includes an L-shaped structural member having a horizontal first arm section 310 adapted for connection to the fixed side support structures, and a vertically extending second arm section 312. The second arm section 312 includes an upper opening 314 for telescopingly receiving the armrest assembly 302, a lower opening 316, and a groove 318 including a fastening aperture 319, along one vertical side. When the armrest assembly 302 is inserted into the second arm section 312, the lower portion of a sleeve 320 extends through the lower opening 316 and is visible. As the armrest assembly is vertically adjusted upward, the sleeve becomes less visible. The groove 318 and the lower opening 316 are on opposite sides of the second arm section 312.

The armrest assembly 302 is telescopingly received in the tubular support 300 and includes a sleeve 320, a post 321, and may also include a bearing 322. The sleeve 320 includes a first side 324 and a second side 326. The first side 324 may include an aperture 328 near the lower end of the first side. Near the top of the first side 324 is an opening 330 which is adapted to receive an operative member 370 of an actuator rod 334. The sleeve 320 flares out at the top to provide an armrest support 336. The second side 326 of the sleeve 320 includes a rectangular aperture 338 at the lower end of the second side. On either side of the aperture 338 is a vertical rib 340 and a vertical rib 341, wherein the vertical rib 341 is significantly longer than the vertical rib 340, thereby increasing the overall effective length of the ribs 340, 341, and preferably provides a length I to width w ratio of at least 3:1, and is preferably at least 10:1, thereby reducing the fore-to-aft shifting of the armrest assembly 302 within the tubular support 300. Referring to FIGS. 25 and 26, the post 321 is rectangular with a lip 342 on its top end and a tab 344 on the bottom end. The post also includes a first vertical surface 346 and a second vertical surface 348. The first vertical surface 346 includes a series of positional detents 350 and a fastening aperture 352 (FIG. 27). The fastening aperture 352 extends completely through the post 321 to the second vertical surface 348. On either side of the positional detents 350 are vertical grooves 354, wherein one of the grooves 354 extends through the bottom of the post 321, and wherein the grooves 354 mateably receive the vertical ribs 340, 341 on the sleeve 320 to prevent complete removal of the armrest assembly 302 from the tubular support 300. Specifically, in the illustrated example, one of the channels in 354 includes an endwall 356 that is abutted by a corresponding rib 340, thereby preventing removal of the arm rest assembly 302 from the tubular support 300. The remaining groove 354 extends through the end of the post 321 to allow passage of the secondary vertical rib 341. The second vertical surface 348 includes ridges 358. The bearing 322 provides a bearing surface and includes two collars 360 which are connected to a vertical strip 362 at their midpoints. Although FIGS. 25 and 26 show the collars 360 as angled relative to each other, in an alternative embodiment, the collars are parallel relative to each other. The ends 364 of the collars 360 flare outwardly to define a space 366.

The post 321 is mateably received in the groove 318 of the second arm section 312, with the second vertical surface 348 abutting the second arm section 312. A fastening means is inserted through fastening aperture 319 and into fastening aperture 352 to secure the post 321 in the groove 318. Alternatively, it is contemplated that the post 321 is not a separate piece fastened in the groove 318, but rather molded into the second arm section 312. When the sleeve 320 is inserted into the second arm section 312, the first vertical surface 346 of the post 321 abuts the second side 326 of the sleeve. Also, the detents 350 on the first vertical surface 346 of the post 321 cover the aperture 338 on the second side 326 of the sleeve 320. The vertical ribs 340, 341 on the second side 326 of the sleeve 320 mate with the vertical grooves 354 of the post 321 so that the positional detents 350 remain positioned over the aperture 338 when the sleeve is adjusted vertically. The bearing 322 is positioned on the sleeve 320 with the vertical strip 362 abutting the first side 324 of the sleeve 320, allowing the collars 360 to wrap around the sleeve 320. The post 321 fits between the collar ends 364 in the space 366. The bearing 322 is stationary within the second arm section 312 and functions to limit horizontal movement of the sleeve within the tubular support.

The height adjustable mechanism 304 comprises the actuator rod 368 that includes the operative member 370, a locking member 372, and a spring 374. In the illustrated example, the operative member 370 is located at the top of the actuator rod 368 and is generally perpendicular to an elongated portion 378 of the actuator rod 368. As shown, the operative member 370 is a lever, however, it is contemplated that a button or tab could be used. Attached to the operative member 370 is a flange 380. On the other side of the flange 380 is a ledge 382 having a protrusion 384. When the height adjustable mechanism 304 is slidably engaged with the armrest assembly 302, the actuator rod 368 is positioned inside the sleeve 320 with the operative member 370 positioned through aperture 330. One end of the spring 374 is placed over the protrusion 384, with the opposite end of the spring 374 placed over a protrusion 386 on the underside of the plate 306. Located at the bottom of the actuator rod 334 (FIG. 33) are two angled ramps 388 which resemble hooks. The angled ramps 388 prevent the locking member 372 from falling to the bottom of the sleeve 320. Above each angled ramp 388 is at least one angled surface, and preferably a pair of angled surfaces 390. Between the pair of angled surfaces 390 is an inclined wedge 392.

As best seen in FIGS. 28-30, the locking member 372 includes teeth 394 that selectively mateably engage the detents 390 on the post 321. The locking member 372 also includes an inclined surface 396 that mates with the inclined wedge 392. The locking member 372 also includes at least one pair, and preferably two pairs of lateral followers 398 which releasably mateably engage the two pairs of angled surfaces 390.

The height adjustable mechanism 304 is slidably engaged within the sleeve 320. When in a locked position, the locking member 372 of the height adjustable mechanism 304 is positioned such that the teeth 394 of the locking member extend through aperture 338 of the sleeve 320 and selectively mate with the detents 350 of the post 321. The actuator rod 368 is positioned over the locking member 372 with the inclined wedge 392 mateably engaged with the inclined surface 396 and the angled surfaces 390 releasably mateably engaged with the lateral followers 398 (FIGS. 31, 32 and 32A).

To vertically adjust the height of the armrest, the operative member 370 is lifted upward, which in turn, compresses the spring 374. When the spring compresses, the angled surfaces 390 of the actuator rod 368 lift upward and push on the lateral followers 398, which causes the teeth 394 to withdraw into the sleeve 320, thereby removing the locking member 372 from locking engagement with the detents 350 (FIGS. 33 and 33A). Once the locking member 372 is disengaged from the detents 350, the armrest can be vertically adjusted upward or downward to a desired height.

To reengage the locking member 372 and relock the armrest in a selected position, the operative member 370 is released, thereby decompressing the spring 374 at the top of the actuator rod 368. Decompression of the spring causes the inclined wedge 392 to slide into mateable engagement with the inclined surface 396. (FIGS. 34, 34A, 35 and 35A). As the inclined wedge 392 and inclined surface 396 are mateably engaged, the teeth 394 of the locking member again extend through the aperture 338 and selectively mate with the detents 350 of the post 321.

Figure 36:
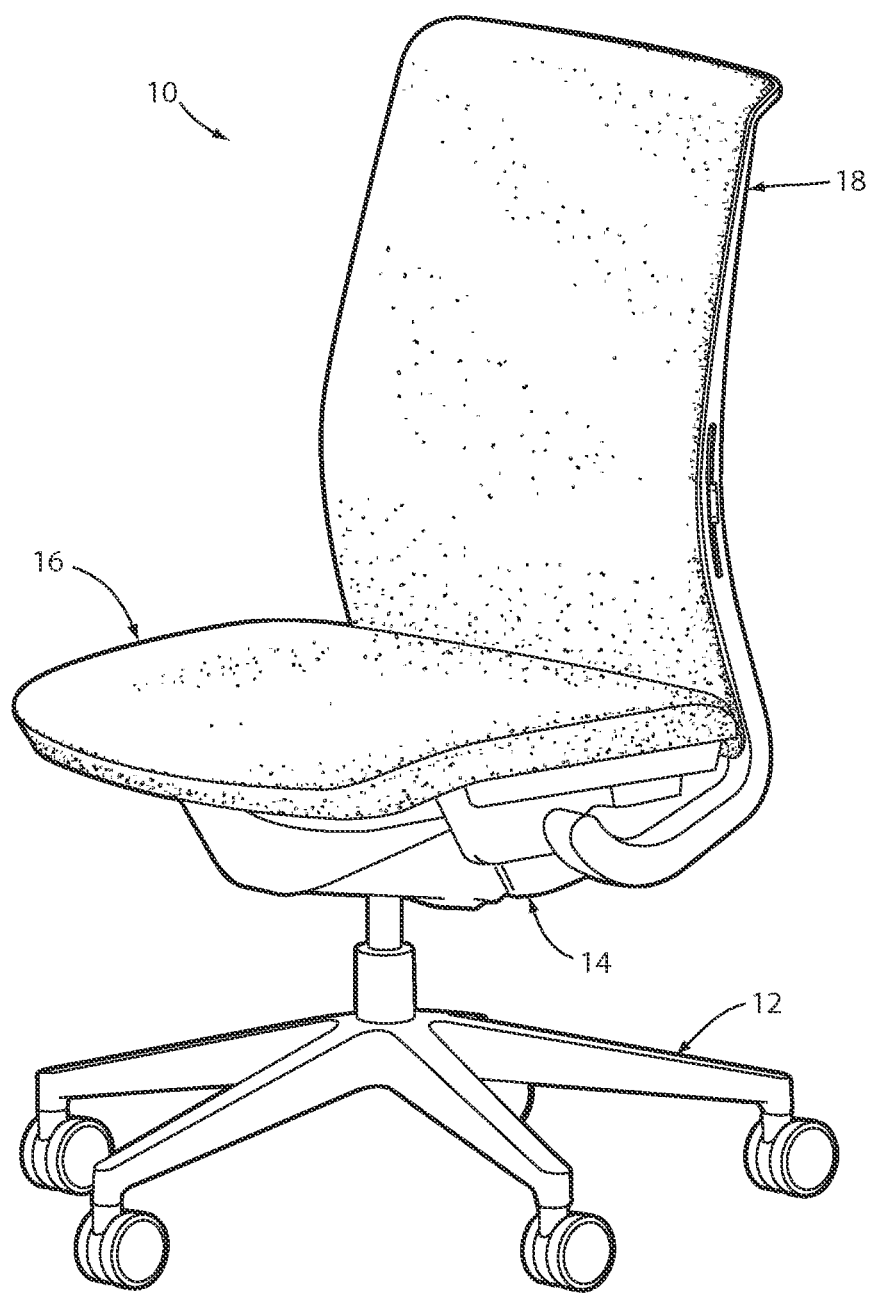
FIG. 36 is a perspective view of a chair assembly.
Figure 37:
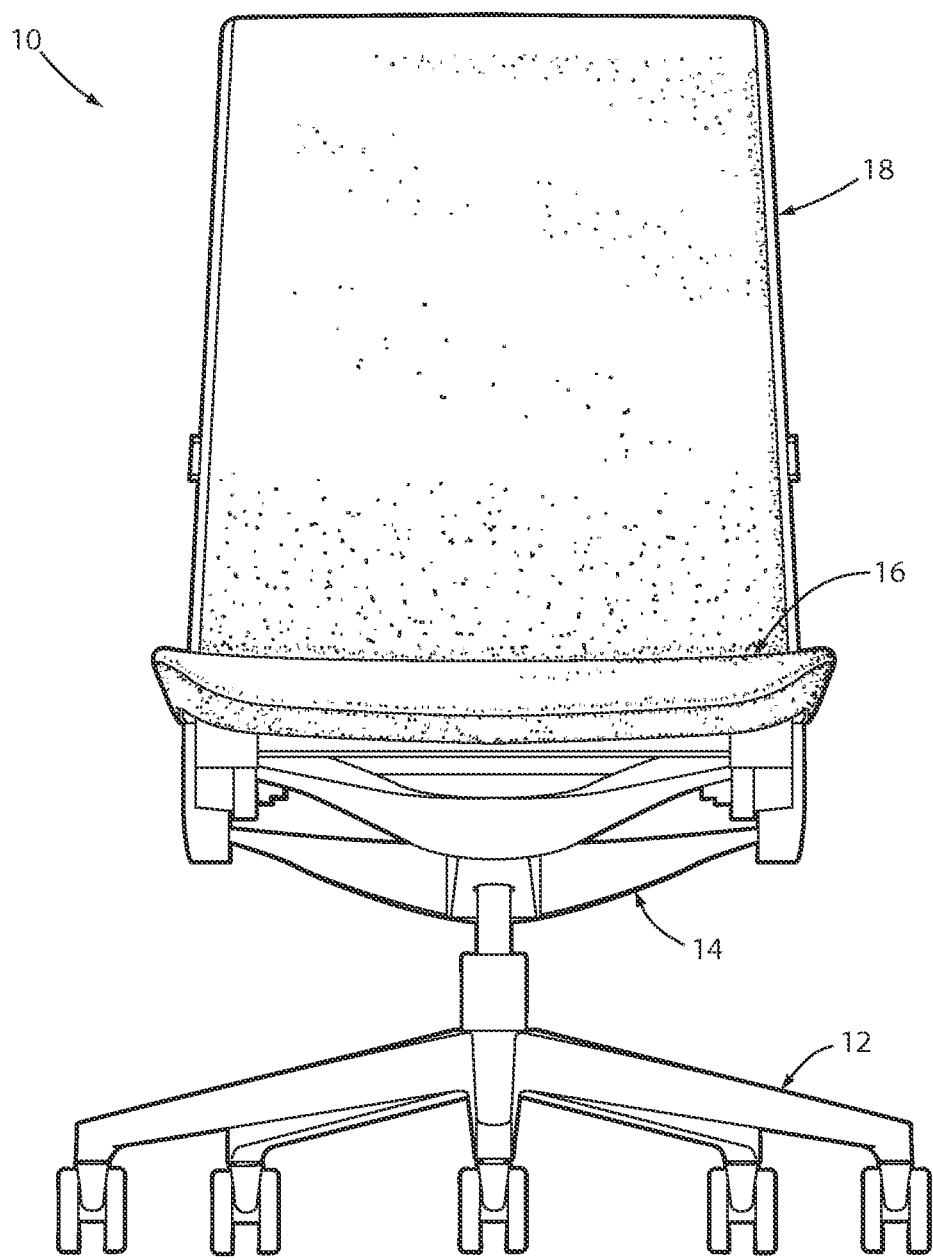
FIG. 37 is a front view of the chair assembly as shown in FIG. 36.
Figure 38:
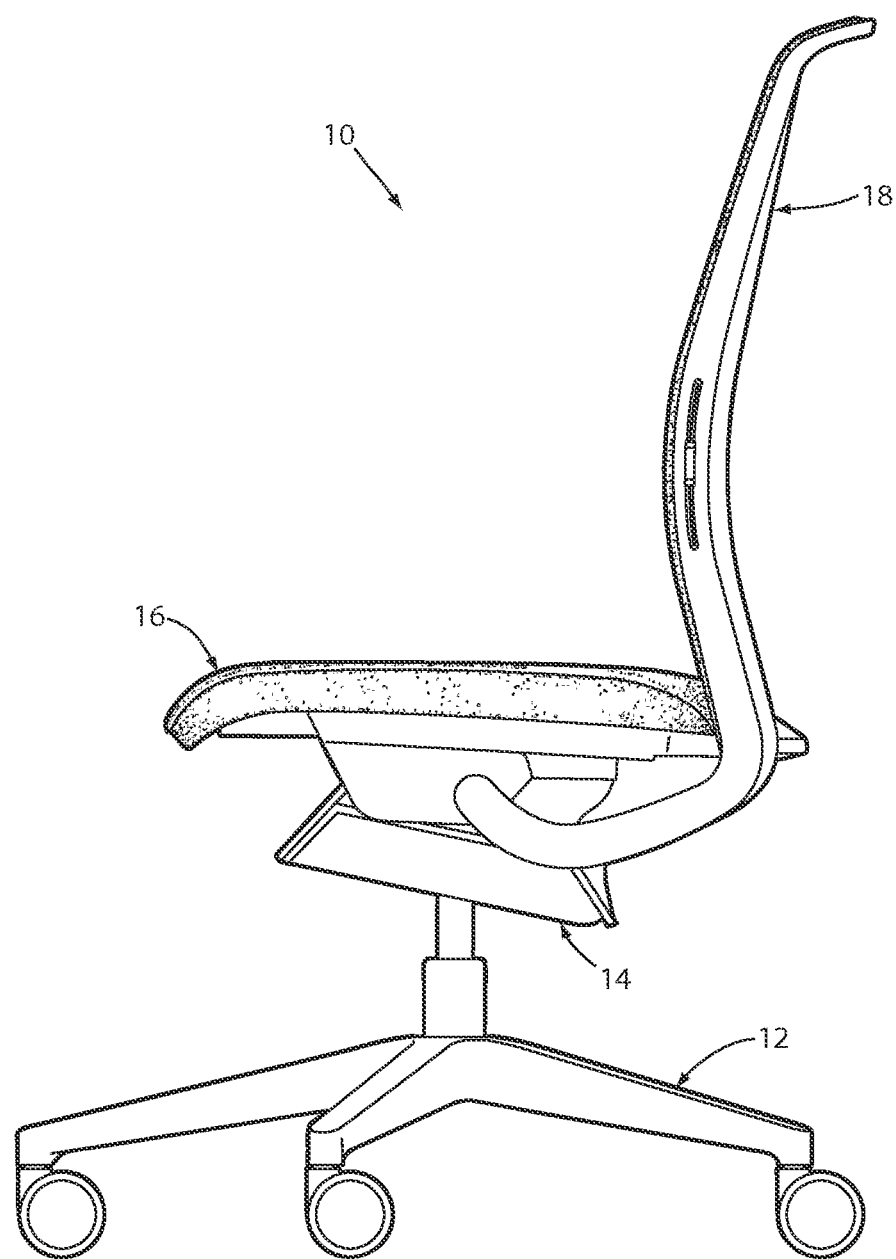
FIG. 38 is first side view of the chair assembly as shown in FIG. 36.
Figure 39:
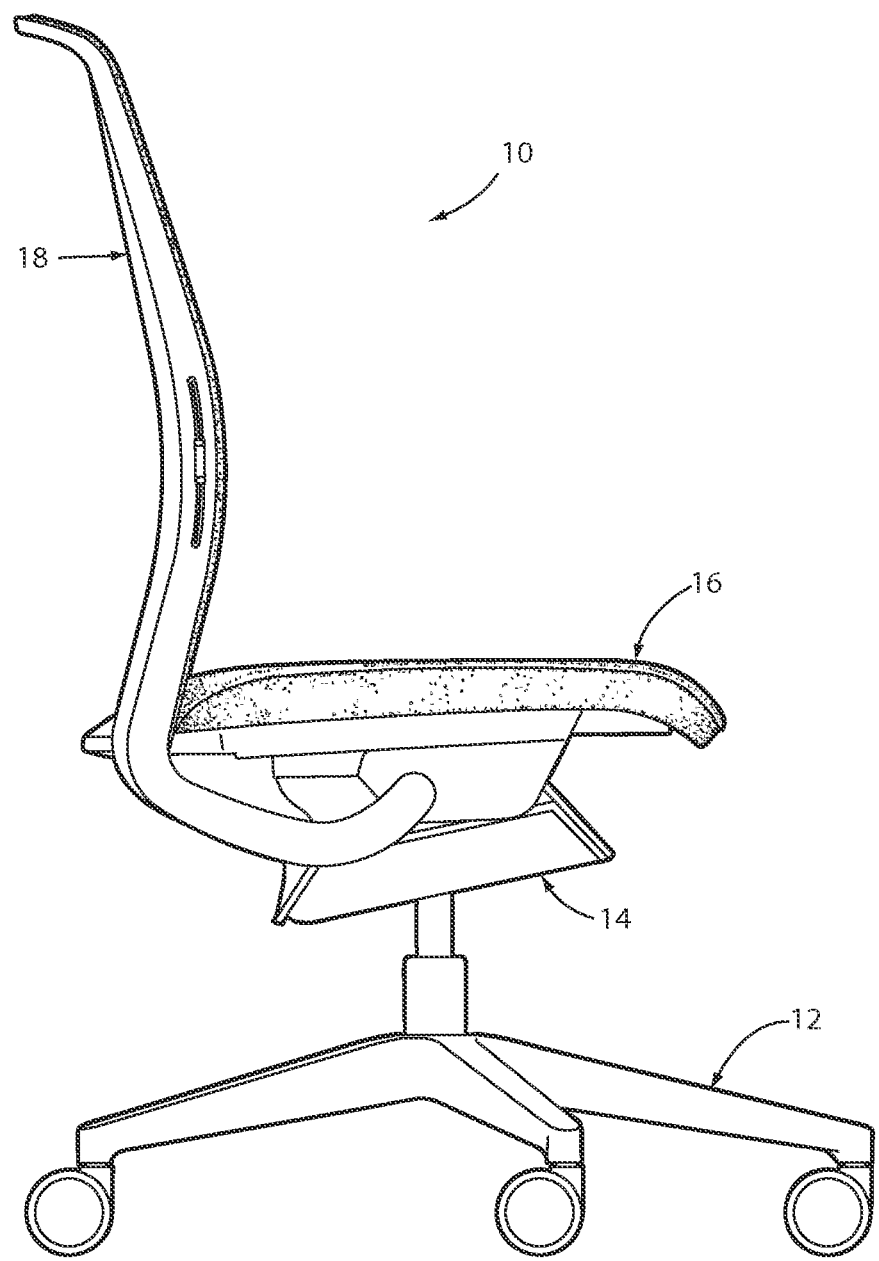
FIG. 39 is a second side view of the chair assembly as shown in FIG. 36.
Figure 40:
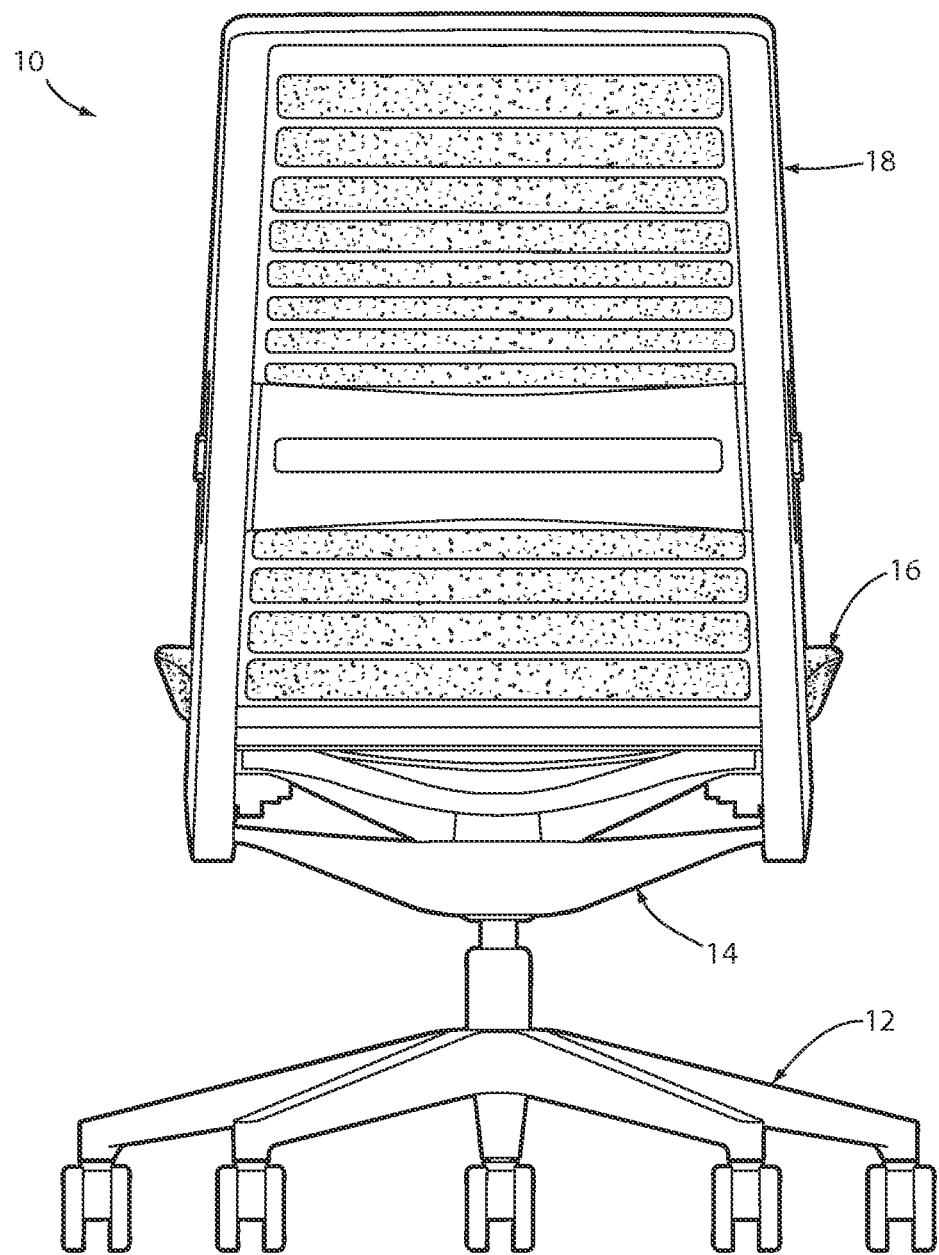
FIG. 40 is a rear view of the chair assembly as shown in FIG. 36.
Figure 41:
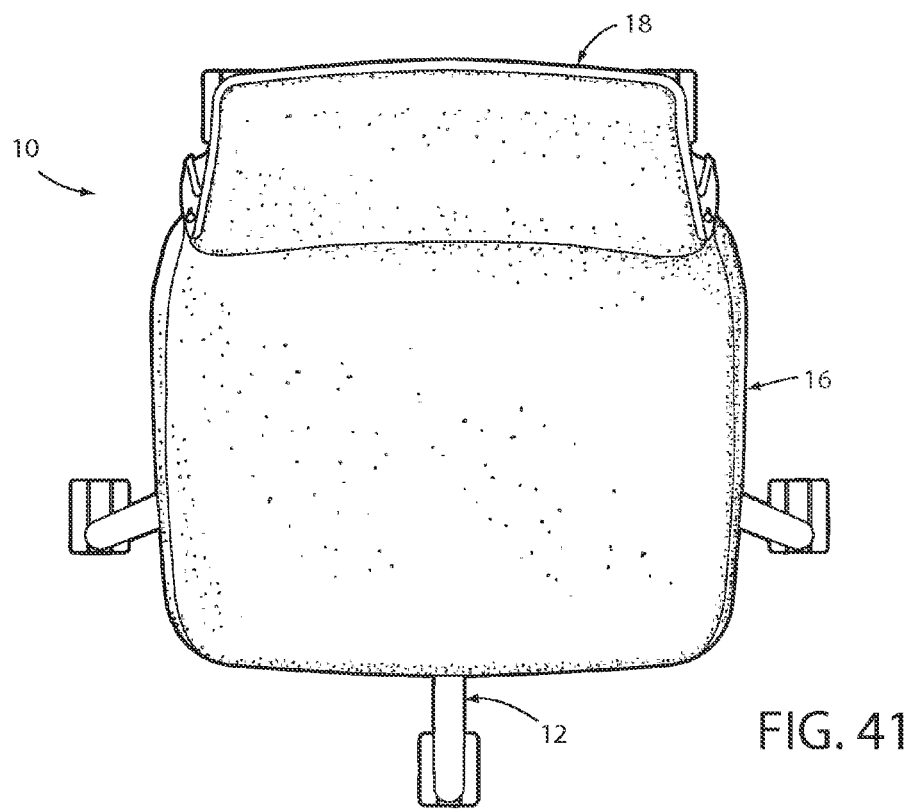
FIG. 41 is a top view of the chair assembly as shown in FIG. 36.
Figure 42:
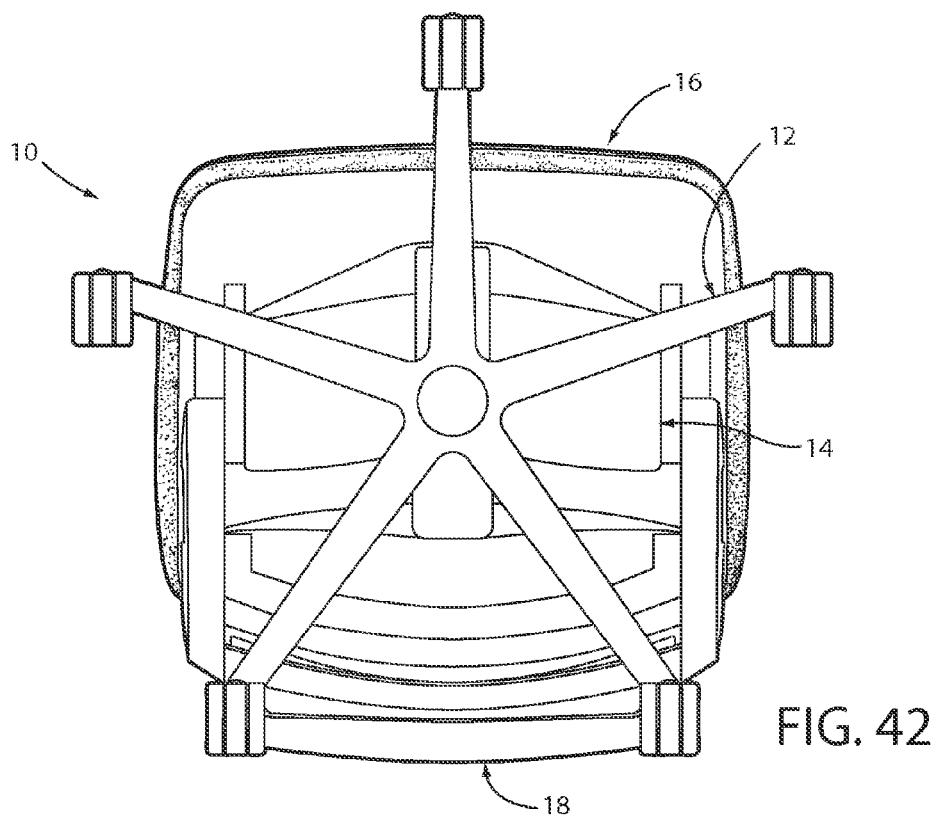
FIG. 42 is a bottom view of the chair assembly as shown in FIG. 36.
Figure 43:
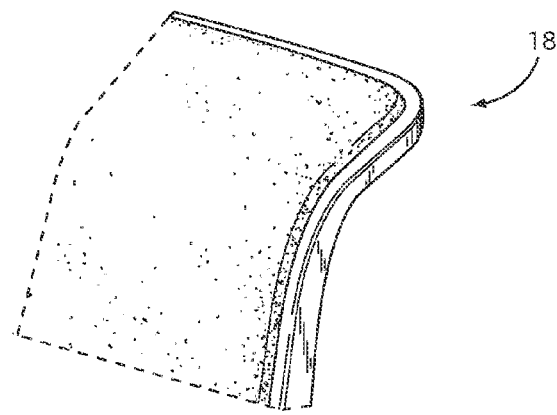
FIG. 43 is a perspective view of an upper corner of a back assembly of a chair.
Figure 44:
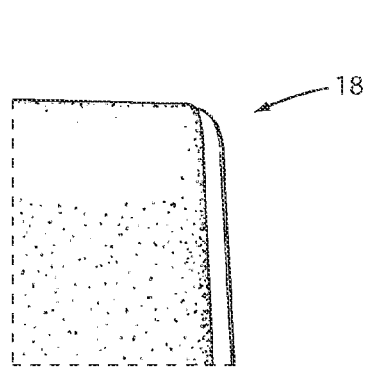
FIG. 44 is a front view of the upper corner of the back assembly shown in FIG. 43.
Figure 45:
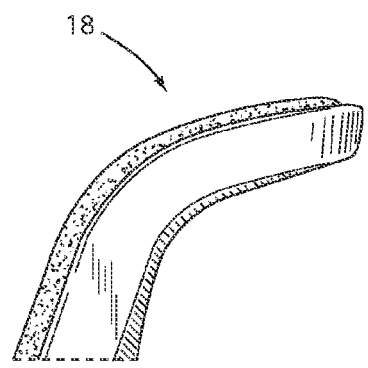
FIG. 45 is a side view of the upper corner of the back assembly shown in FIG. 43.
Figure 46:
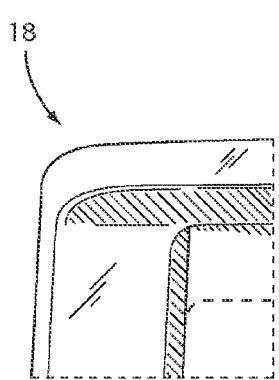
FIG. 46 is a rear view of the upper corner of the back assembly shown in FIG. 43.
Figure 47:
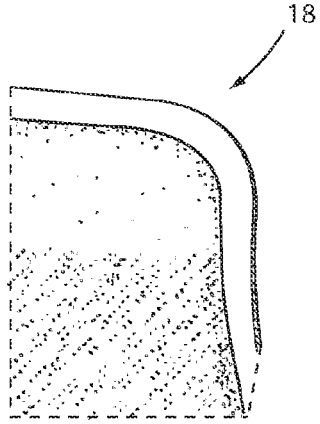
FIG. 47 is a top view of the upper corner of the back assembly shown in FIG. 43.
Figure 48:
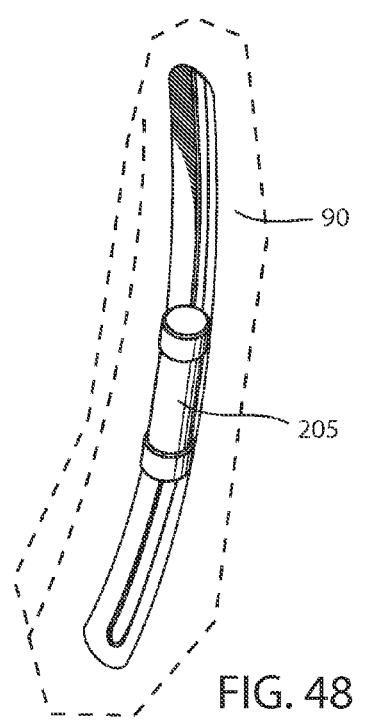
FIG. 48 is a perspective view of a handle apparatus of a lumbar assembly of a chair assembly.
Figure 49:
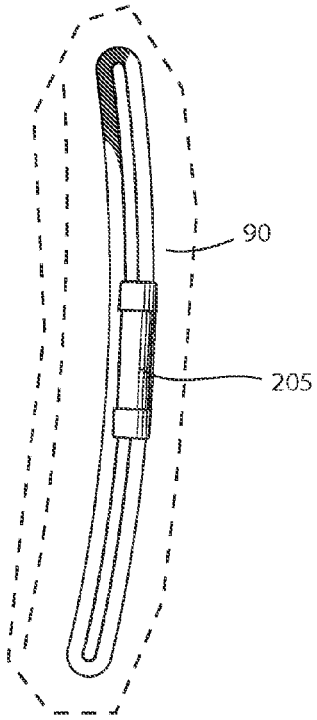
FIG. 49 is a side view of the handle apparatus as shown in FIG. 48.
Figure 50:
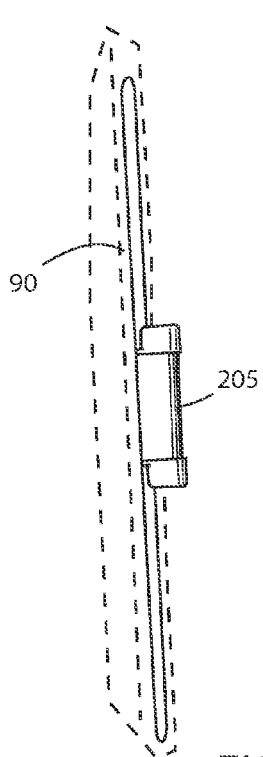
FIG. 50 is a rear view of the handle apparatus as shown in FIG. 48.
Figure 51:
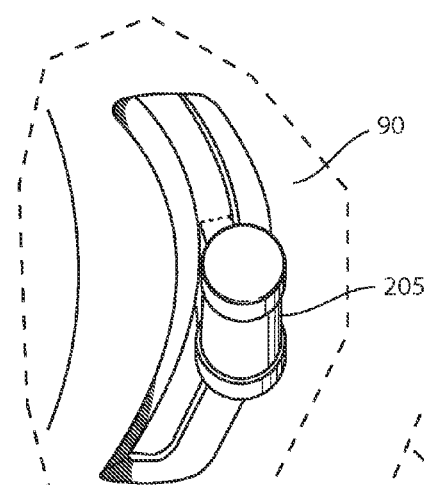
FIG. 51 is a top view of the handle apparatus as shown in FIG. 48.
Figure 52:
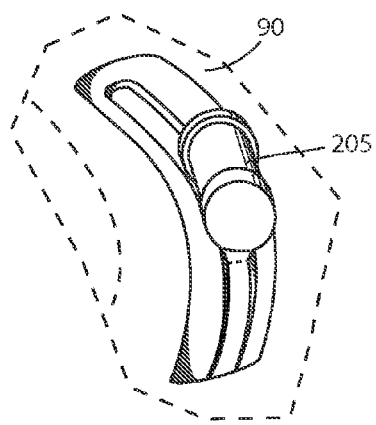
FIG. 52 is a bottom view of the handle apparatus.

An embodiment of a chair assembly is illustrated in a variety of views, including a perspective view (FIG. 36), a front elevational view (FIG. 37), a first side elevational view (FIG. 38), a second side elevational view (FIG. 39), a rear elevational view (FIG. 40), a top plan view (FIG. 41), and a bottom plan view (FIG. 42). A portion of an embodiment of a back assembly is illustrated in a variety of views, including a perspective view (FIG. 43), a front elevational view (FIG. 44), a side elevational view (FIG. 45), a rear elevational view (FIG. 46), and a top plan view (FIG. 47). An embodiment of an adjustment handle is illustrated in a variety of views, including a perspective view (FIG. 48), a side elevational view (FIG. 49), a front elevational view (FIG. 50), a top view (FIG. 51), and a bottom view (FIG. 52).

In the foregoing description, it will be readily appreciated by those skilled in the art that alternative combinations of the various components and elements of the invention and modifications to the invention may be made without departing from the concepts as disclosed. Such modifications are to be considered as included in the following claims, unless these claims by their language expressly state otherwise.

The invention claimed is:

1. A chair component assembly, comprising:
 a support component including a surface adapted to support a portion of a seated user and facing in a first direction, the support component comprising:
  a shell member having an outer peripheral edge;
  at least one coupler having an interior and an opening facing the outer peripheral edge of the shell member and that is transverse to the surface of the support component; and
  at least one tab member located substantially proximate the opening of the at least one coupler, wherein the at least one tab member extends away from the surface of the support component and into the interior of the at least one coupler; and
 an upholstery cover assembly wrapped about at least a portion of the support component and including an edge that extends through the opening of the least one coupler is retained within the interior of the at least one coupler by the at least one tab member.

2. The chair component assembly of claim 1, wherein the upholstery cover assembly includes a flexible cover portion and a stile member that is substantially less flexible than the cover portion and that is attached to an edge of the cover portion, wherein the stile member is retained within the interior of the at least one coupler by the at least one tab.

3. The chair component assembly of claim 2, wherein the at least one coupler is integral with the shell member.

4. The chair component assembly of claim 3, wherein the at least one tab is integral with the shell member.

5. The chair component assembly of claim 4, wherein the at least one tab is flexibly resilient.

6. The chair component assembly of claim 4, wherein the at least one coupler and the at least one tab includes a plurality of couplers and tabs spaced about the peripheral edge of the shell member.

7. The chair component assembly of claim 5, wherein the at least one coupler includes a C-shaped cross-sectional configuration.

8. The chair component assembly of claim 1, wherein the at least one coupler is integral with the shell member.

9. The chair component assembly of claim 1, wherein the at least one tab is integral with the shell member.

10. The chair component assembly of claim 9, wherein the at least one tab is flexibly resilient.

11. The chair component assembly of claim 1, wherein the at least one coupler and the at least one tab includes a plurality of couplers and tabs spaced about a periphery of the shell member.

12. The chair component assembly of claim 1, wherein the chair component comprises a chair back assembly.

13. A chair component assembly, comprising:
    a support component adapted to support a portion of a seated user and including a shell member having a channel and at least one fastener located within the channel; and
    an upholstery cover assembly wrapped about at least a portion of the support component and including a drawstring located within a drawstring tunnel, wherein the drawstring is adapted to draw the upholstery cover assembly about the support component, wherein the drawstring and the drawstring tunnel are each retained within the channel by the at least one fastener.

14. The chair component assembly of claim 13, wherein the channel and the at least one fastener are each integral with the shell member.

15. The chair component assembly of claim 14, wherein the at least one fastener includes a plurality of cooperating teeth that secure the drawstring and the drawstring tunnel therebetween.

16. The chair component assembly of claim 15, wherein the chair component comprises a chair seat support.

17. The chair component assembly of claim 16, wherein the channel is downwardly opening.

18. A chair component assembly, comprising:
    a support component adapted to support a portion of a seated user and including a shell member having an aperture;
    an upholstery cover assembly wrapped about at least a portion of the support component and including a drawstring located within a drawstring tunnel, wherein the drawstring is adapted to draw the upholstery cover assembly about the support component, and wherein the drawstring includes at least one free end; and
    at least one fastener engaging the aperture of the shell member and securing at least a portion of the at least one free end of the drawstring within the aperture.

19. The chair component assembly of claim 18, wherein the aperture of the shell comprises a channel.

20. The chair component assembly of claim 18, wherein the at least one fastener includes a spring clip.

21. The chair component assembly of claim 20, wherein the at least one fastener comprises a U-shaped cross-sectional configuration.

22. The choir component assembly of claim 20, wherein the at least one fastener includes a pair of spring clips.

23. The chair component of claim 22, wherein the pair of spring clips secure a single free end of the at least one free end of the drawstring.

24. The chair component of claim 20, wherein the at least one free end of the drawstring includes a pair of free ends, and wherein the at least one spring clip includes a single spring clip that secures the pair of free ends.

25. The chair component assembly of claim 18, wherein the chair component comprises a chair seat support.

26. A chair component assembly, comprising:
    a support component adapted to support a portion of a seated user and including a shell member having a channel extending about a majority of an outer periphery of the support component and at least one fastener located within the channel; and
    an upholstery cover assembly wrapped about at least a portion of the support component and including a drawstring located within a drawstring tunnel, wherein the drawstring is adapted to draw the upholstery cover assembly about the support component, and wherein at least one of the drawstring and the drawstring tunnel are retained within the channel by the at least one fastener.

* * * * *